US012649229B2

(12) United States Patent
Narang et al.

(10) Patent No.: US 12,649,229 B2
(45) Date of Patent: Jun. 9, 2026

(54) SIMULATION AND REINFORCEMENT LEARNING TECHNIQUES FOR PERFORMING ROBOTIC TASKS

(71) Applicant: NVIDIA CORPORATION, Santa Clara, CA (US)

(72) Inventors: Yashraj Shyam Narang, Seattle, WA (US); Kier Storey, Altrincham (GB); Iretiayo Akinola, Seattle, WA (US); Dieter Fox, Seattle, WA (US); Kelly Guo, Richmond Hill (CA); Ankur Handa, Seattle, WA (US); Fengyun Lu, Altrincham (GB); Miles Macklin, Auckland (NZ); Adam Moravanszky, Embrach (CH); Philipp Reist, Zurich (CH); Gavriel State, Toronto (CA); Lukasz Wawrzyniak, Milton (CA)

(73) Assignee: NVIDIA CORPORATION, Santa Clara, CA (US)

( * ) Notice: Subject to any disclaimer, the term of this patent is extended or adjusted under 35 U.S.C. 154(b) by 318 days.

(21) Appl. No.: 18/074,387

(22) Filed: Dec. 2, 2022

(65) Prior Publication Data

US 2023/0321822 A1     Oct. 12, 2023

Related U.S. Application Data

(60) Provisional application No. 63/329,331, filed on Apr. 8, 2022.

(51) Int. Cl.
*B25J 9/16* (2006.01)

(52) U.S. Cl.
CPC ............... *B25J 9/163* (2013.01); *B25J 9/161* (2013.01); *B25J 9/1666* (2013.01); *B25J 9/1671* (2013.01)

(58) Field of Classification Search
CPC . B25J 9/163; B25J 9/161; B25J 9/1666; B25J 9/1671; B25J 9/1679; B25J 9/1687; G05B 2219/45091
See application file for complete search history.

(56) References Cited

U.S. PATENT DOCUMENTS

2020/0281676 A1\*    9/2020   Rohs ...................... A61B 34/10

OTHER PUBLICATIONS

Freeman, Daniel, et al. "Speeding Up Reinforcement Learning with a New Physics Simulation Engine" (2021). (Year: 2021).\*
Macklin, Miles, et al. "Local optimization for robust signed distance field collision." Proceedings of the ACM on Computer Graphics and Interactive Techniques 3.1 (2020): 1-17 (Year: 2020).\*

(Continued)

*Primary Examiner* — Adam R Mott
*Assistant Examiner* — Matthew C Gammon
(74) *Attorney, Agent, or Firm* — Artegis Law Group, LLP

(57) ABSTRACT

One embodiment of a method for controlling a robot includes performing a plurality of simulations of a robot interacting with one or more objects represented by one or more signed distance functions (SDFs), where performing the plurality of simulations comprises reducing a number of contacts between the one or more objects that are being simulated, and updating one or more parameters of a machine learning model based on the plurality of simulations to generate a trained machine learning model.

20 Claims, 10 Drawing Sheets

(56) References Cited

OTHER PUBLICATIONS

Moravanszky, Adam, Pierre Terdiman, and A. Kirmse. "Fast contact reduction for dynamics simulation." Game programming gems 4 (2004): 253-263. (Year: 2004).*
Lee, Youngwoon, et al. "Adversarial skill chaining for long-horizon robot manipulation via terminal state regularization." arXiv preprint arXiv:2111.07999 (2021). (Year: 2021).*
Makoviychuk, Viktor, et al. "Isaac gym: High performance gpu-based physics simulation for robot learning." arXiv preprint arXiv:2108.10470 (2021). (Year: 2021).*
Luo et al., "Deep Reinforcement Learning for Robotic Assembly of Mixed Deformable and Rigid Objects", In IEEE/RSJ International Conference on Intelligent Robots and Systems, Oct. 1-5, 2018, pp. 2062-2069.
Luo et al., "Reinforcement Learning on Variable Impedance Controller for High-Precision Robotic Assembly", International Conference on Robotics and Automation, May 20-24, 2019, pp. 3080-3087.
Luo et al., "Robust Multi-Modal Policies for Industrial Assembly via Reinforcement Learning and Demonstrations: A Large-Scale Study", Robotics: Science and Systems, Jul. 12-16, 2021, 10 pages.
Luo et al., "Dynamic Experience Replay", 3rd Conference on Robot Learning, 2019, 10 pages.
Luo et al., "A Learning Approach to Robot-Agnostic Force-Guided High Precision Assembly", arXiv:2010.08052, Aug. 2, 2021, 7 pages.
Macklin et al., "Small Steps in Physics Simulation", https://doi.org/10.1145/3309486.3340247, Jul. 26-28, 2019, 7 pages.
Macklin et al., "Local optimization for robust signed distance field collision", Proc. ACM Comput. Graph. Interact. Tech., vol. 3, No. 1, May 2020, 9 pages.
Mahler et al., "Learning Ambidextrous Robot Grasping Policies", Science Robotics, vol. 4, Jan. 16, 2019, pp. 1-11.
Makoviichuk et al., "RL Games", Retrieved from https://github.com/Denys88/rlgames/, on Mar. 28, 2023, 16 pages.
Makoviychuk et al., "Isaac Gym: High Performance GPU Based Physics Simulation For Robot Learning", 35th Conference on Neural Information Processing Systems, 2021, 12 pages.
Mandlekar et al., "ROBOTURK: A Crowdsourcing Platform for Robotic Skill Learning through Imitation", In Conference on Robot Learning, arXiv:1811.02790, Nov. 7, 2018, 15 pages.
Martin-Vega et al., "Industrial Perspective on Research Needs and Opportunities in Manufacturing Assembly", Journal of Manufacturing Systems vol. 14, No. 1, 1995, pp. 45-58.
Martin-Martin et al., "Variable Impedance Control in End-Effector Space: An Action Space for Reinforcement Learning in Contact-Rich Tasks", International Conference on Intelligent Robots and Systems, arXiv:1906.08880, Aug. 2, 2019, 8 pages.
Matl et al., "Inferring the Material Properties of Granular Media for Robotic Tasks", In IEEE International Conference on Robotics and Automation, arXiv:2003.08032, Nov. 5, 2020, 8 pages.
Matl et al., "STReSSD: Sim-To-Real from Sound for Stochastic Dynamics", 4th Conference on Robot Learning, arXiv:2011.03136, Nov. 5, 2020, 25 pages.
Moravanszky et al., "Fast Contact Reduction for Dynamics Simulation", In Andrew Kirmse, editor, Game Programming Gems, vol. 4, 2004, 10 pages.
Narang et al., "Sim-to-Real for Robotic Tactile Sensing via Physics-Based Simulation and Learned Latent Projections", arXiv:2103.16747, Mar. 31, 2021, 8 pages.
NVIDIA, "NVIDIA Omniverse Platform", Retrieved from https://developer.nvidia.com/nvidia-omniverse-platform, on Mar. 28, 2023, 17 pages.
NVIDIA, "NVIDIA PhysX SDK", Retrieved from https://github.com/NVIDIAGameWorks/PhysX, on Mar. 28, 2023, 4 pages.
Otaduy et al., "A Modular Haptic Rendering Algorithm for Stable and Transparent 6-DOF Manipulation", IEEE Transactions on Robotics, DOI:10.1109/TRO.2006.876897, vol. 22, No. 4, Aug. 2006, pp. 751-762.

Peng et al., "Learning Locomotion Skills Using DeepRL: Does the Choice of Action Space Matter", DOI: 10.1145/3099564.3099567, In Proceedings of the ACM SIGGRAPH / Eurographics Symposium on Computer Animation, Jul. 28-30, 2017, 13 pages.
Peng et al., "DeepLoco: Dynamic Locomotion Skills Using Hierarchical Deep Reinforcement Learning", DOI:http://dx.doi.org/10.1145/3072959.3073602, ACM Transactions on Graphics, vol. 36, No. 4, Article 41, Jul. 2017, pp. 41:1-41:16.
Eth Zurich, "Robot Dynamics Lecture Notes", 2017, 100 pages.
Rocchi et al., "Stable Simulation of Underactuated Compliant Hands", IEEE International Conference on Robotics and Automation, May 16-21, 2016, pp. 4938-4944.
Rudin et al., "Learning to Walk in Minutes Using Massively Parallel Deep Reinforcement Learning", 5th Conference on Robot Learning, 2021, 10 pages.
Schoettler et al., "Meta-Reinforcement Learning for Robotic Industrial Insertion Tasks", International Conference on Intelligent Robots and Systems, DOI: 10.1109/IROS45743.2020.9340848, Oct. 25-29, 2020, pp. 9728-9735.
Shao et al., "Learning to Scaffold the Development of Robotic Manipulation Skills", IEEE International Conference on Robotics and Automation, May 31-Aug. 31, 2020, pp. 5671-5677.
Si et al., "Taxim: An Example-based Simulation Model for GelSight Tactile Sensors", arXiv:2109.04027, Dec. 14, 2021, 8 pages.
Sidefx, "Houdini", Retrieved from https://www.sidefx.com/products/houdini/, on Mar. 26, 2023, 10 pages.
Son et al., "Sim-to-Real Transfer of Bolting Tasks with Tight Tolerance", International Conference on Intelligent Robots and Systems, DOI:10.1109/IROS45743.2020.9341644, Oct. 25-29, 2020, pp. 9056-9063.
Spector et al., "Deep Reinforcement Learning for Contact-Rich Skills Using Compliant Movement Primitives", arXiv:2008.13223, Oct. 25, 2020, 27 pages.
Stan et al., "Reinforcement Learning for Assembly Robots: A Review", Proceedings in Manufacturing Systems, vol. 15, Issue 3, 2020, pp. 135-146.
Suarez-Ruiz et al., "Can Robots Assemble an IKEA Chair?", Science Robotics, vol. 3, Apr. 18, 2018, 3 pages.
Szot et al., "Habitat 2.0: Training Home Assistants to Rearrange their Habitat", arXiv:2106.14405, Jun. 28, 2021, 32 pages.
Tasora et al., "Chrono: An Open Source Multi-Physics Dynamics Engine", In High Performance Computing in Science and Engineering, 2016, 27 pages.
Thomas et al., "Learning Robotic Assembly from CAD", In IEEE International Conference on Robotics and Automation (ICRA), May 21-25, 2018, pp. 3524-3531.
Tobin et al., "Domain Randomization for Transferring Deep Neural Networks from Simulation to the Real World", In IEEE/RSJ International Conference on Intelligent Robots and Systems (IROS), Sep. 24-28, 2017, pp. 23-30.
Todorov et al., "MuJoCo: A Physics Engine for Model-Based Control", In IEEE/RSJ International Conference on Intelligent Robots and Systems, Oct. 7-12, 2012, pp. 5026-5033.
Vecerik et al., "Leveraging Demonstrations for Deep Reinforcement Learning on Robotics Problems with Sparse Rewards", arXiv:1707.08817, Oct. 8, 2018, 10 pages.
Vecerik et al., "A Practical Approach to Insertion with Variable Socket Position Using Deep Reinforcement Learning", In IEEE International Conference on Robotics and Automation (ICRA), May 20-24, 2019, pp. 754-760.
Drigalski et al., "Robots Assembling Machines: Learning from the World Robot Summit 2018 Assembly Challenge", Advanced Robotics, DOI: 10.1080/01691864.2019.1705910, Dec. 26, 2019, 15 pages.
Vuong et al., "Learning Sequences of Manipulation Primitives for Robotic Assembly", arXiv:2011.00778, Mar. 26, 2021, 7 pages.
Wang et al., "TACTO: A Fast, Flexible and Open-source Simulator for High-Resolution Vision-based Tactile Sensors", arXiv:2012.08456, Dec. 15, 2020, 8 pages.
Wong et al., "OSCAR: Data-Driven Operational Space Control for Adaptive and Robust Robot Manipulation", arXiv:2110.00704, Oct. 2, 2021, 8 pages.

(56)            References Cited

OTHER PUBLICATIONS

Wu et al., "MAT: Multi-Fingered Adaptive Tactile Grasping via Deep Reinforcement Learning", 3rd Conference on Robot Learning, arXiv:1909.04787, Oct. 10, 2019, 20 pages.

Wu et al., "Learning Dense Rewards for Contact-Rich Manipulation Tasks", arXiv:2011.08458, Nov. 17, 2020, 8 pages.

Xiang et al., "Sapien: A SimulAted Part-based Interactive Environment", In IEEE/CVF Conference on Computer Vision and Pattern Recognition (CVPR), 2020, pp. 11097-11107.

Xu et al., "Implicit Multibody Penalty-Based Distributed Contact", IEEE Transactions on Visualization and Computer Graphics, DOI 10.1109/TVCG.2014.2312013, vol. 20, No. 9, Sep. 2014, pp. 1266-1279.

Yu et al., "RoboAssembly: Learning Generalizable Furniture Assembly Policy in a Novel Multi-robot Contact-Rich Simulation Environment", arXiv:2112.10143, Dec. 19, 2021, 8 pages.

Zachares et al., "Interpreting Contact Interactions to Overcome Failure in Robot Assembly Tasks", arXiv:2101.02725, May 11, 2021, 9 pages.

Zhang, Mabel M., "Necessity for More Realistic Contact Simulation", In Robotics: Science and Systems (RSS) Workshop on Visuotactile Sensors for Robust Manipulation, 2020, 3 pages.

Zhang et al., "Learning Insertion Primitives with Discrete-Continuous Hybrid Action Space for Robotic Assembly Tasks", arXiv:2110.12618, Oct. 25, 2021, 7 pages.

Zhao et al., "Towards Robotic Assembly by Predicting Robust, Precise and Task-oriented Grasps", 4th Conference on Robot Learning, arXiv:2011.02462, Nov. 4, 2020, 11 pages.

Zhu et al., "Robosuite: A Modular Simulation Framework and Benchmark for Robot Learning", arXiv:2009.12293, Sep. 25, 2020, 17 pages.

Bodin, Kenneth, "Thread", Twitter, Apr. 22, 2020, 3 pages.

Hebecker et al., "Towards real-world force-sensitive robotic assembly through deep reinforcement learning in simulations", In IEEE/ASME International Conference on Advanced Intelligent Mechatronics (AIM), 2021, pp. 1045-1051.

Afzal et al., "A Study on the Challenges of Using Robotics Simulators for Testing", arXiv:2004.07368, Apr. 15, 2020, 8 pages.

Allshire et al., "Transferring Dexterous Manipulation from GPU Simulation to a Remote Real-World TriFinger", arXiv:2108.09779, Aug. 22, 2021, 13 pages.

Andrews et al., "Contact and Friction Simulation for Computer Graphics", SIGGRAPH Courses, https://doi.org/10.1145/3450508.3464571, Aug. 9-13, 2021, 124 pages.

Andrychowicz et al., "Learning Dexterous In-Hand Manipulation", The International Journal of Robotics Research, vol. 39, No. 1, 2020, pp. 3-20.

Apolinarska et al., "Robotic Assembly of Timber Joints using Reinforcement Learning", https://doi.org/10.1016/j.autcon.2021.103569, Automation in Construction, vol. 125, Feb. 27, 2021, 8 pages.

Bauza et al., "Tactile Object Pose Estimation from the First Touch with Geometric Contact Rendering", 4th Conference on Robot Learning, 2020, 15 pages.

Beltran-Hernandez et al., "Variable Compliance Control for Robotic Peg-in-Hole Assembly: A Deep-Reinforcement-Learning Approach", doi:10.3390/app10196923, vol. 10, No. 6923, 2020, 17 pages.

Blender Foundation, "Blender: A 3d Modelling and Rendering Package", Retrieved from https://manpages.ubuntu.com/manpages/xenial/man1/blender.1.html, on Mar. 27, 2023, 9 pages.

Assembly Magazine, "BNP Media", Retrieved from https://www.assemblymag.com/, 2022, 3 pages.

Buss, Samuel R., "Introduction to Inverse Kinematics with Jacobian Transpose, Pseudoinverse and Damped Least Squares Methods", Oct. 7, 2009, 19 pages.

Chebotar et al., "Closing the Sim-to-Real Loop: Adapting Simulation Randomization with Real World Experience", International Conference on Robotics and Automation, May 20-24, 2019, pp. 8973-8979.

Chen et al., "A System for General In-Hand Object Re-Orientation", 5th Conference on Robot Learning, arXiv:2111.03043, Nov. 4, 2021, 24 pages.

Choi et al., "On the Use of Simulation in Robotics: Opportunities, Challenges, and Suggestions for Moving Forward", Proc. Natl. Academy Sci. , 2021, 9 pages.

Clegg et al., "Learning to Dress: Synthesizing Human Dressing Motion via Deep Reinforcement Learning", https://doi.org/10.1145/3272127.3275048, ACM Transactions on Graphics, vol. 37, No. 6, Article 179, Nov. 2018, pp. 179:1-179:10.

Clever et al., "Assistive Tele-op: Leveraging Transformers to Collect Robotic Task Demonstrations", arXiv:2112.05129, Dec. 9, 2021, 9 pages.

Coumans, Erwin, "Bullet Real-Time Physics Simulation", Retrieved from https://pybullet.org/wordpress/, Mar. 21, 2022, 9 pages.

Da et al., "Learning a Contact-Adaptive Controller for Robust, Efficient Legged Locomotion", 4th Conference on Robot Learning, 2020, 12 pages.

Davchev et al., "Residual Learning from Demonstration: Adapting DMPs for Contact-rich Manipulation", arXiv:2008.07682, Sep. 14, 2021, 8 pages.

Ehsani et al., "ManipulaTHOR: A Framework for Visual Object Manipulation", In IEEE/CVF Conference on Computer Vision and Pattern Recognition, 2021, pp. 4497-4506.

Eppner et al., "Acronym: A Large-Scale Grasp Dataset Based on Simulation", In IEEE International Conference on Robotics and Automation, arXiv:2011.09584, Nov. 18, 2020, 6 pages.

Fan et al., "A Learning Framework for High Precision Industrial Assembly", arXiv:1809.08548, Apr. 15, 2019, 7 pages.

Ferguson et al., "Intersection-free Rigid Body Dynamics", https://doi.org/10.1145/3450626.3459802, ACM Transactions on Graphics, vol. 40, No. 4, Article 183, Aug. 2021, pp. 183:1-183:16.

Emika, Franka, "Libfranka Examples", 2017, 1 page.

Gissler et al., "Interlinked SPH Pressure Solvers for Strong Fluid-Rigid Coupling", https://doi.org/http://dx.doi.org/10.1145/3284980, ACM Transactions on Graphics, vol. 38, No. 1, Article 5, Jan. 2019, pp. 5:1-5:13.

Glondu et al., "Efficient Collision Detection for Brittle Fracture", Eurographics/ ACM SIGGRAPH Symposium on Computer Animation, DOI: 10.2312/SCA/SCA12/285-294, 2012, pp. 285-294.

Ha et al., "FlingBot: The Unreasonable Effectiveness of Dynamic Manipulation for Cloth Unfolding", 5th Conference on Robot Learning, 2021, arXiv:2105.03655, Oct. 18, 2021, 15 pages.

Hauser, Kris, "Robust Contact Generation for Robot Simulation with Unstructured Meshes", In Robotics Research, Springer International Publishing, 2016, 16 pages.

Horak et al., "On the Similarities and Differences among Contact Models in Robot Simulation", DOI: 10.1109/LRA.2019.2891085, 2019, 7 pages.

Hou et al., "Data-efficient Hierarchical Reinforcement Learning for Robotic Assembly Control Applications", DOI 10.1109/TIE.2020.3038072, IEEE Transactions On Industrial Electronics, 2021, 11 pages.

Huang et al., "DefGraspSim: Physics-based simulation of grasp outcomes for 3D deformable objects", IEEE Robotics and Automation Letters, arXiv:2203.11274, Mar. 21, 2022, 8 pages.

Huang et al., "A Dataset of Daily Interactive Manipulation", The International Journal of Robotics Research, 2019, pp. 1-8.

Inoue et al., "Deep Reinforcement Learning for High Precision Assembly Tasks", In IEEE/RSJ International Conference on Intelligent Robots and Systems, Sep. 24-28, 2017, pp. 819-825.

Jia et al., "A Survey of Automated Threaded Fastening", IEEE Transactions On Automation Science and Engineering, DOI:10.1109/TASE.2018.2835382, 2019, 13 pages.

Jin et al., "Trajectory Optimization for Manipulation of Deformable Objects: Assembly of Belt Drive Units", In IEEE International Conference on Robotics and Automation, Jun. 12, 2021, 9 pages.

Khader et al., "Stability-Guaranteed Reinforcement Learning for Contact-Rich Manipulation", IEEE Robotics and Automation Letters, DOI 10.1109/LRA.2020.3028529, vol. 6, No. 1, Jan. 2021, 8 pages.

(56) References Cited

OTHER PUBLICATIONS

Khatib, Oussama, "A Unified Approach for Motion and Force Control of Robot Manipulators: The Operational Space Formulation", IEEE Journal of Robotics and Automation Letters, vol. RA-3, No. 1, Feb. 1987, pp. 43-53.

Kim et al., "Finite Element Analysis and Modeling of Structure with Bolted Joints", Science Direct, doi: 10.1016/j.apm.2006.03.020, Applied Mathematical Modelling, 2007, pp. 895-911.

Kim et al., "Data-Driven Contact Clustering for Robot Simulation", In IEEE International Conference on Robotics and Automation, May 20-24, 2019, pp. 8278-8284.

Kimble et al., "Benchmarking Protocols for Evaluating Small Parts Robotic Assembly Systems", IEEE Robot Autom Lett. vol. 5, No. 2, 2020, 21 pages.

Tyrrell, Michael, "Fast & Reliable Micro Screw Fastening", Retrieved from https://www.youtube.com/watch?v=BOY3oZ8SkZU, Nov. 24, 2016, 10 pages.

Labbe et al., "CosyPose: Consistent Multi-View Multi-Object 6D Pose Estimation", https://www.di.ens.fr/willow/research/cosypose, arXiv:2008.08465, Aug. 19, 2020, 41 pages.

Lacoursiere, Claude, "Ghosts and Machines: Regularized Variational Methods for Interactive Simulations of Multibodies with Dry Frictional Contacts", Department of Computing Science, Jun. 2007, 472 pages.

Lee et al., "Learning Quadrupedal Locomotion over Challenging Terrain", DOI: 10.1126/scirobotics.abc5986, vol. 5, Issue 47, Oct. 21, 2020, 22 pages.

Lee et al., "Making Sense of Vision and Touch: Learning Multimodal Representations for Contact-Rich Tasks", arXiv:1907.13098, Jul. 28, 2019, 14 pages.

Lee et al., "IKEA Furniture Assembly Environment for Long-Horizon Complex Manipulation Tasks", In IEEE International Conference on Robotics and Automation (ICRA), IEEE, 2021, 7 pages.

Lee et al., "Adversarial Skill Chaining for Long-Horizon Robot Manipulation via Terminal State Regularization", 5th Conference on Robot Learning, arXiv:2111.07999, Nov. 15, 2021, 13 pages.

Li et al., "iGibson 2.0: Object-Centric Simulation for Robot Learning of Everyday Household Tasks", 5th Conference on Robot Learning, arXiv:2108.03272, Nov. 3, 2021, 20 pages.

Li et al., "Incremental Potential Contact: Intersection- and Inversion-free, Large-Deformation Dynamics", ACM Trans. Graph., https://doi.org/10.1145/3386569.3392425, vol. 39, No. 4, Article 49, Jul. 2020, pp. 49:1-49:20.

Lian et al., "Benchmarking Off-The-Shelf Solutions to Robotic Assembly Tasks", arXiv:2103.05140, Mar. 8, 2021, 7 pages.

Liu et al., "The Role of Physics-Based Simulators in Robotics", https://doi.org/10.1146/annurev-control-072220-093055, vol. 4, 2021, 26 pages.

* cited by examiner

504

SIMULATION AND REINFORCEMENT LEARNING TECHNIQUES FOR PERFORMING ROBOTIC TASKS

CROSS-REFERENCE TO RELATED APPLICATIONS

This application claims priority benefit of the United States Provisional Patent Application titled, "GPU-ACCELERATED SIMULATION AND REINFORCEMENT LEARNING FOR ROBOTIC ASSEMBLY," filed on Apr. 8, 2022, and having Ser. No. 63/329,331. The subject matter of this related application is hereby incorporated herein by reference.

BACKGROUND

Technical Field

Embodiments of the present disclosure relate generally to computer science and robotics and, more specifically, to simulation and reinforcement learning techniques for performing robotic tasks.

Description of the Related Art

Robots are being increasingly used to perform tasks automatically in various environments. One approach for controlling a robot when performing a complex robot-based task is to first train a machine learning model that is then used to control the robot to perform the complex task. The machine learning model is trained using training data that can be computer generated or otherwise obtained.

Conventional simulation techniques are not often used to generate training data for training a machine learning model that controls a robot. Such techniques cannot efficiently simulate the complex interactions between the various objects that are normally involved in many robotic tasks. For example, in the manufacturing context, one task a robot could perform is fastening a nut onto a bolt. During the fastening process, the nut and bolt make contact at numerous points. Simulating the interactions between the nut and bolt, including the numerous points of contact, using conventional techniques can require an extraordinary amount of time and/or computation resources. As a result, conventional simulation techniques cannot be effectively used to generate training data for training a machine learning model to control a robot.

To address the above inefficiencies of using simulations to generate training data for machine learning models that control robots, some conventional techniques use training data that is generated by physical robots that are programmed to perform the relevant robotic tasks in a real-world environment. These types of approaches are referred to as "real-world" training. One drawback of real-world training is that this type of training can cause damage, including wear and tear, to the robot that performs the relevant robotic tasks in the real-world environment and to the objects with which the robot interacts. In some cases, real-world training also requires manual demonstrations of how tasks are to be performed and manual corrections to enable the machine learning model to better control the robot when performing the task. Such manual demonstrations and corrections can be tedious and very time consuming.

As the foregoing illustrates, what is needed in the art are more effective techniques for controlling robots to perform tasks.

SUMMARY

One embodiment of the present disclosure sets forth a computer-implemented method for controlling a robot. The method includes performing a plurality of simulations of a robot interacting with one or more objects represented by one or more signed distance functions (SDFs). Performing the plurality of simulations comprises reducing a number of contacts between the one or more objects that are being simulated. The method further includes updating one or more parameters of a machine learning model based on the plurality of simulations to generate a trained machine learning model.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that, with the disclosed techniques, policy models for performing robotic tasks can be trained in a computationally efficient manner using simulations. Notably, the disclosed techniques do not require real-world training or tedious manual demonstrations and corrections in order to train the policy models. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide improved techniques for training and utilizing machine learning models to perform robotic tasks with objects whose interactions involve a relatively large number of contacts. In some embodiments, each of one or more machine learning models is trained via reinforcement learning by (1) performing parallel simulations of a robot performing a task involving objects that are represented as signed distance functions (SDFs), and (2) updating parameters of the machine learning model(s) based on the simulations. A contact reduction technique is applied to reduce the number of contacts between objects in each simulation. The simulations employ a solver, such as the Gauss-Seidel solver, to simulate physics, including the interactions between objects. Subsequent to training, the states of physical objects can be input into the machine learning model(s) as observations, and the machine learning model(s) generate actions that can be used to control a physical robot to perform task(s) involving physical objects.

The techniques for training and utilizing machine learning model(s) to perform robotic tasks have many real-world applications. For example, those techniques could be used to control a robot to perform an assembly task in which parts are assembled together. As another example, those techniques could be used to control a robot to grasp and move an object. As a further example, those techniques could be used to control a robot to place items into a package. As yet another example, those techniques could be used to control a robot to move (e.g., to walk) within an environment.

The above examples are not in any way intended to be limiting. As persons skilled in the art will appreciate, as a general matter, the techniques for controlling robots described herein can be implemented in any suitable application.

System Overview

Figure 1:
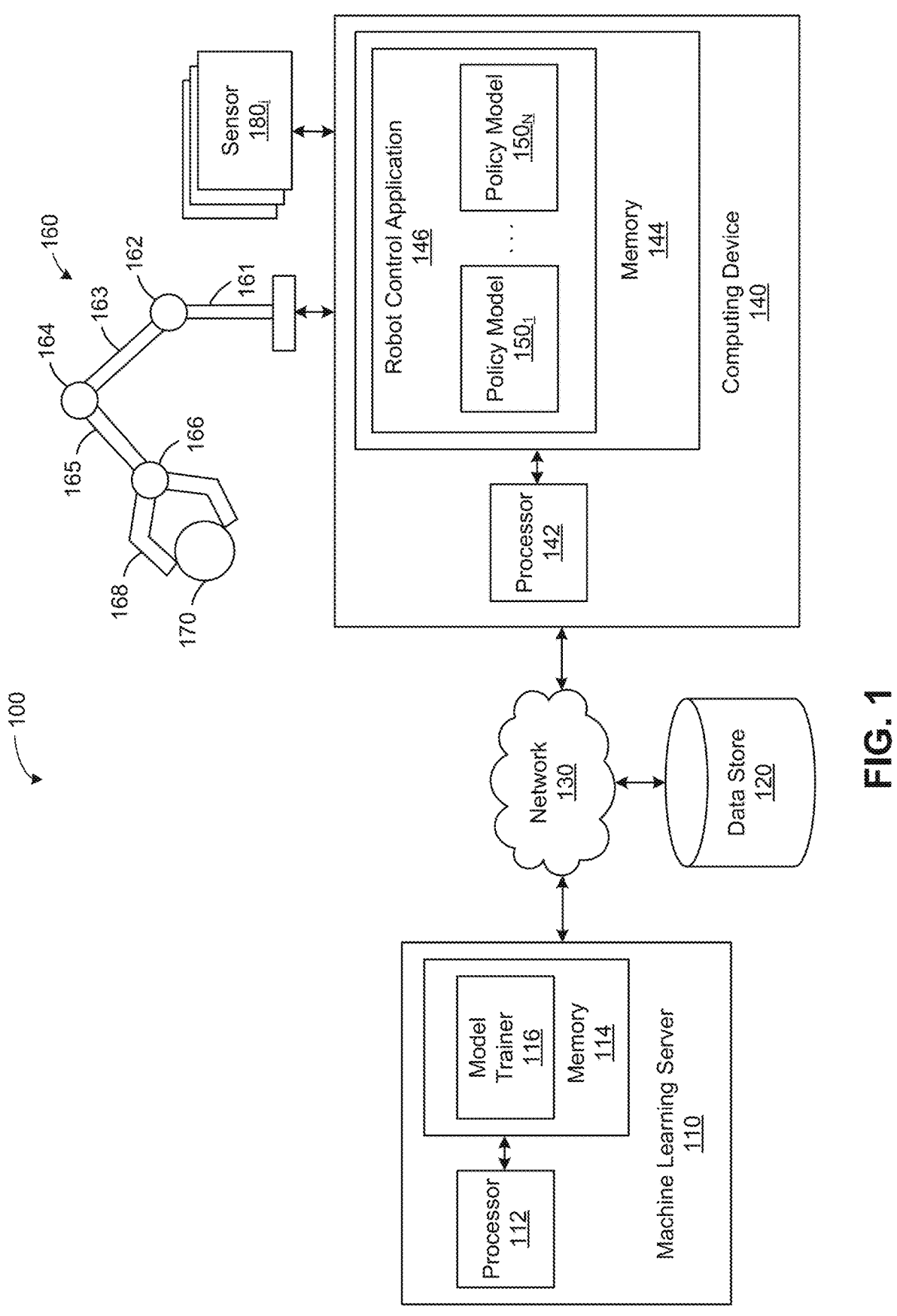
FIG. 1 is a block diagram illustrating a computer-based system configured to implement one or more aspects of the various embodiments.

FIG. 1 is a block diagram illustrating a computer-based system 100 configured to implement one or more aspects of the various embodiments. As shown, the system 100 includes a machine learning server 110, a data store 120, and a computing device 140 in communication over a network 130, which can be a wide area network (WAN) such as the Internet, a local area network (LAN), or any other suitable network. In addition, the system 100 includes a robot 160 and one or more sensors 180, (referred to herein collectively as sensors 180 and individually as a sensor 180) that are in communication with the computing device 140 (e.g., via a network). In some embodiments, the sensors can include one or more RGB (red, green, blue) cameras and optionally one or more depth cameras, such as cameras using time-of-flight sensors, LIDAR (light detection and ranging) sensors, etc.

As shown, a model trainer 116 executes on a processor 112 of the machine learning server 110 and is stored in a system memory 114 of the machine learning server 110. The processor 112 receives user input from input devices, such as a keyboard or a mouse. In operation, the processor 112 is the master processor of the machine learning server 110, controlling and coordinating operations of other system components. In particular, the processor 112 can issue commands that control the operation of a graphics processing unit (GPU) (not shown) that incorporates circuitry optimized for graphics and video processing, including, for example, video output circuitry. The GPU can deliver pixels to a display device that can be any conventional cathode ray tube, liquid crystal display, light-emitting diode display, or the like.

The system memory 114 of the machine learning server 110 stores content, such as software applications and data, for use by the processor 112 and the GPU. The system memory 114 can be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) can supplement or replace the system memory 114. The storage can include any number and type of external memories that are accessible to the processor 112 and/or the GPU. For example, and without limitation, the storage can include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of GPUs, the number of system memories 114, and the number of applications included in the system memory 114 can be modified as desired. Further, the connection topology between the various units in FIG. 1 can be modified as desired. In some embodiments, any combination of the processor 112, the system memory 114, and a GPU can be replaced with any type of virtual computing system, distributed computing system, or cloud computing environment, such as a public, private, or a hybrid cloud.

In some embodiments, the model trainer 116 is configured to train one or more machine learning models, including a number of policy models $150_{1-N}$ (referred to herein individually as a policy model 150 and collectively as policy models 150). Given an observation of the state of one or more objects within an environment, a policy model 150 generates an action for a robot to perform. Techniques for training the policy models 150 are discussed in greater detail below in conjunction with FIGS. 3 and 8. Training data and/or trained machine learning models, including the policy models 150, can be stored in the data store 120. In some embodiments, the data store 120 can include any storage device or devices, such as fixed disc drive(s), flash drive(s), optical storage, network attached storage (NAS), and/or a storage area-network (SAN). Although shown as accessible over the network 130, in some embodiments the machine learning server 110 can include the data store 120.

As shown, a robot control application 146 that utilizes the policy models 150 is stored in a system memory 144, and executes on a processor 142, of the computing device 140. Once trained, the policy models 150 can be deployed, such as via robot control application 146, to control a robot 160 to perform tasks given observations in the form of sensor data captured by the sensor(s) 180, as discussed in greater detail below in conjunction with FIGS. 3 and 10.

As shown, the robot 160 includes multiple links 161, 163, and 165 that are rigid members, as well as joints 162, 164, and 166 that are movable components that can be actuated to cause relative motion between adjacent links. In addition, the robot 160 includes a gripper 168, which is the last link of the robot 160 and can be controlled to grip an object, such as object 170. Although an exemplar robot 160 is shown for illustrative purposes, techniques disclosed herein can be employed to control any suitable robot.

Figure 2:
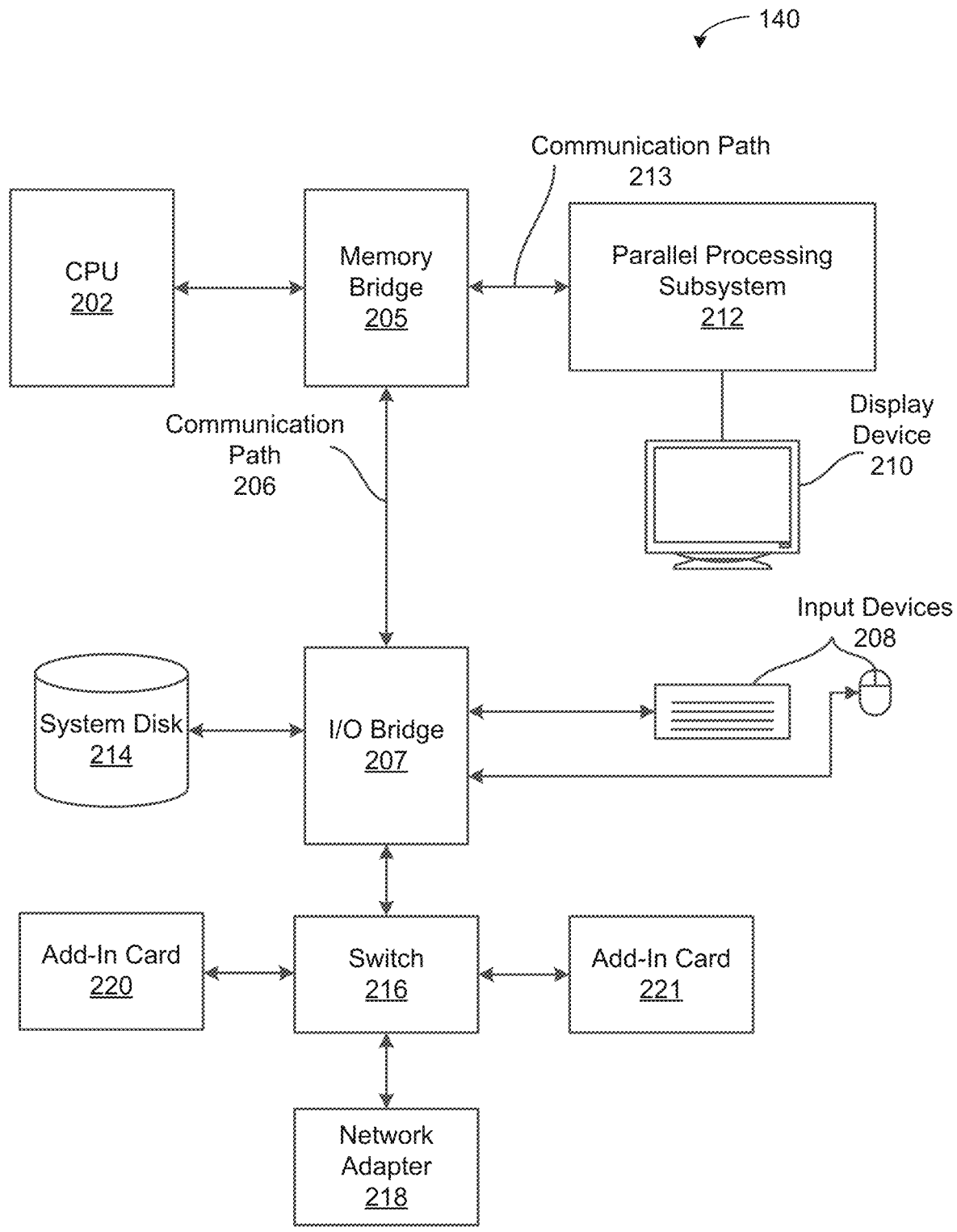
FIG. 2 is a block diagram of the computing device of FIG. 1, according to various embodiments.

FIG. 2 is a block diagram of the computing device 140 of FIG. 1, according to various embodiments. As persons skilled in the art will appreciate, computing device 140 can be any type of technically feasible computer system, including, without limitation, a server machine, a server platform, a desktop machine, laptop machine, a hand-held/mobile device, or a wearable device. In some embodiments, computing device 140 is a server machine operating in a data center or a cloud computing environment that provides scalable computing resources as a service over a network. In some embodiments, the machine learning server 110 can include similar components as the computing system 140.

In various embodiments, the computing device 140 includes, without limitation, the processor 142 and the system memory 144 coupled to a parallel processing subsystem 212 via a memory bridge 205 and a communication path 213. Memory bridge 205 is further coupled to an I/O (input/output) bridge 207 via a communication path 206, and I/O bridge 207 is, in turn, coupled to a switch 216.

In one embodiment, I/O bridge 207 is configured to receive user input information from optional input devices 208, such as a keyboard or a mouse, and forward the input information to processor 142 for processing via communication path 206 and memory bridge 205. In some embodiments, computing device 140 may be a server machine in a cloud computing environment. In such embodiments, computing device 140 may not have input devices 208. Instead, computing device 140 may receive equivalent input information by receiving commands in the form of messages transmitted over a network and received via the network adapter 218. In one embodiment, switch 216 is configured to provide connections between I/O bridge 207 and other components of the computing device 140, such as a network adapter 218 and various add-in cards 220 and 221.

In one embodiment, I/O bridge 207 is coupled to a system disk 214 that may be configured to store content and applications and data for use by processor 142 and parallel processing subsystem 212. In one embodiment, system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 207 as well.

In various embodiments, memory bridge 205 may be a Northbridge chip, and I/O bridge 207 may be a Southbridge chip. In addition, communication paths 206 and 213, as well as other communication paths within computing device 140, may be implemented using any technically suitable protocols, including, without limitation, AGP (Accelerated Graphics Port), HyperTransport, or any other bus or point-to-point communication protocol known in the art.

In some embodiments, parallel processing subsystem 212 comprises a graphics subsystem that delivers pixels to an optional display device 210 that may be any conventional cathode ray tube, liquid crystal display, light-emitting diode display, or the like. In such embodiments, the parallel processing subsystem 212 incorporates circuitry optimized for graphics and video processing, including, for example, video output circuitry. As described in greater detail below in conjunction with FIGS. 2-3, such circuitry may be incorporated across one or more parallel processing units (PPUs), also referred to herein as parallel processors, included within parallel processing subsystem 212. In other embodiments, the parallel processing subsystem 212 incorporates circuitry optimized for general purpose and/or compute processing. Again, such circuitry may be incorporated across one or more PPUs included within parallel processing subsystem 212 that are configured to perform such general purpose and/or compute operations. In yet other embodiments, the one or more PPUs included within parallel processing subsystem 212 may be configured to perform graphics processing, general purpose processing, and compute processing operations. System memory 144 includes at least one device driver configured to manage the processing operations of the one or more PPUs within parallel processing subsystem 212. In addition, the system memory 144 includes a rendering application 230. The rendering application 230 can be any technically-feasible application that renders virtual 3D scenes, and rendering the scenes can include rendering SDFs according to techniques disclosed herein. For example, the rendering application 230 could be a gaming application or a rendering application that is used in film production. Although described herein primarily with respect to the rendering application 230, techniques disclosed herein can also be implemented, either entirely or in part, in other software and/or hardware, such as in the parallel processing subsystem 212.

In various embodiments, parallel processing subsystem 212 may be integrated with one or more of the other elements of FIG. 1 to form a single system. For example, parallel processing subsystem 212 may be integrated with processor 142 and other connection circuitry on a single chip to form a system on chip (SoC).

In one embodiment, processor 142 is the master processor of computing device 140, controlling and coordinating operations of other system components. In one embodiment, processor 142 issues commands that control the operation of PPUs. In some embodiments, communication path 213 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 202, and the number of parallel processing subsystems 212, may be modified as desired. For example, in some embodiments, system memory 144 could be connected to processor 142 directly rather than through memory bridge 205, and other devices would communicate with system memory 144 via memory bridge 205 and processor 142. In other embodiments, parallel processing subsystem 212 may be connected to I/O bridge 207 or directly to processor 142, rather than to memory bridge 205. In still other embodiments, I/O bridge 207 and memory bridge 205 may be integrated into a single chip instead of existing as one or more discrete devices. In certain embodiments, one or more components shown in FIG. 2 may not be present. For example, switch 216 could be eliminated, and network adapter 218 and add-in cards 220, 221 would connect directly to I/O bridge 207. Lastly, in certain embodiments, one or more components shown in FIG. 2 may be implemented as virtualized resources in a virtual computing environment, such as a cloud computing environment. In particular, the parallel processing subsystem 212 may be implemented as a virtualized parallel processing subsystem in some embodiments. For example, the parallel processing subsystem 212 could be implemented as a virtual graphics processing unit (GPU) that renders graphics on a virtual machine (VM) executing on a server machine whose GPU and other physical resources are shared across multiple VMs.

Simulation and Reinforcement Learning for Robot Control

Figure 3:
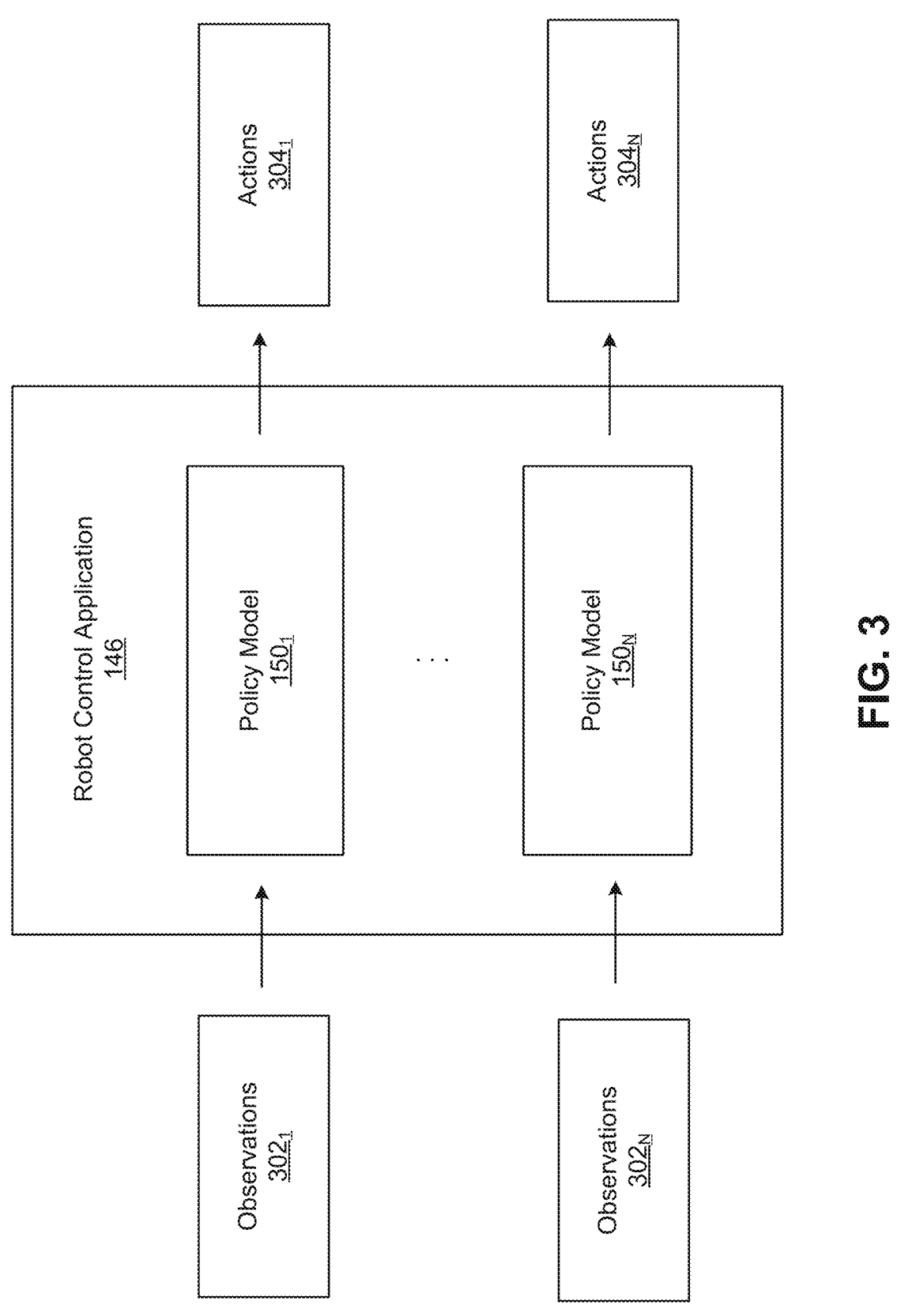
FIG. 3 is a more detailed illustration of the robot control application of FIG. 1, according to various embodiments.

FIG. 3 is a more detailed illustration of the robot control application 146 of FIG. 1, according to various embodiments. As shown, the robot control application 146 includes a number of policy models 150. Each policy model 150 is a machine learning model that takes corresponding observations 302 as input and outputs corresponding actions 304. The policy models 150 are trained to control a robot to perform tasks with objects whose interactions involve a relatively large number of contacts. For example, the interactions can include more than 100 contacts between objects. In addition, the contacts can include collisions between complicated interfaces (rather than simple planar interfaces), such as that of a nut and a bolt, or the pins of a chip and a motherboard. Collisions between complicated interfaces are also sometimes referred to as "contact-rich" interactions. The robot can manipulate and/or otherwise interact with any suitable objects in some embodiments. Examples of objects include fasteners (e.g., nuts and bolts), connectors (e.g., various types of cables), and other objects in the environment.

Any technically feasible observations 302, such as image data captured by one or more cameras, data on the joint positions of a robot, object position information, etc. can be input into the policy models 150 in some embodiments. In some embodiments, each action 304 that is output by a policy model 150 can be in the form of input to a controller of a robot that causes the robot to move. For example, consider the assembly task of fastening a nut onto a bolt. In such a case, the assembly task can be divided into the sub-tasks (which can themselves be considered tasks) of picking up the nut, placing the nut on the bolt, and screwing the nut onto the bolt. Given observations of the nut and bolt, a trained policy model can be applied to generate actions for performing each of the picking, placing, and screwing sub-tasks. Although described herein primarily with respect to particular assembly tasks as illustrative examples, the techniques disclosed herein can be used train policy models for controlling a robot to perform any technically feasible task, including other assembly tasks in which parts are assembled together, grasping tasks in which a robot picks up and moves an object, kitting tasks in which items are placed into packages, locomotion tasks in which a robot moves within an environment, among other things. For example, in the case of locomotion, joints of the robot can be simulated as objects inserted into each other. As another example, gears can be simulated with interactions between teeth of the gears.

In some embodiments, the model trainer 116 trains each policy model 150 via reinforcement learning by performing parallel simulations of a robot performing a task involving objects that are represented as voxel-based signed distance functions (SDFs), and updating parameters of the policy model 150 based on the simulations. During the simulations, movements of the robot are simulated according to known constraints (e.g., degrees of freedom (DOFs) of the robot, range of motion of the robot, maximum force that can be applied, etc.). The simulations are used to determine how well the policy model 150 being trained is performing, which can be calculated as a reward, and parameters of the policy model 150 are updated via backpropagation to improve the performance of the policy model 150.

In some embodiments, each SDF representing objects in a simulation specifies distances from points in a virtual environment to the surface of an object. More formally, an SDF is a function $\phi(x): \mathbb{R}^3 \to \mathbb{R}$ that maps a point x in Cartesian space to a Euclidean distance to a surface of an object. The surface is implicitly defined by $\phi(x)=0$, and the sign of the SDF indicates whether the point x is inside or outside the surface. The gradient $\nabla\phi(x)$ provides the normal at the point x on the surface. Collectively, the SDF value and gradient define a vector to push a colliding object out of the surface. In some embodiments, the model trainer 116 generates an SDF for an object via sampling and computes gradients via finite-differencing. In such cases, given a triangle mesh representing the boundaries of the object, an SDF can be generated for the mesh at initialization time and stored as a 3D texture, which can also enable GPU-accelerated texture fetching with trilinear filtering and relatively fast O(1) lookups. When the shapes of objects include many small features, an SDF resolution of $256^3$ or greater can be used.

During each iteration of training, a contact reduction technique is applied to reduce the number of contacts between objects in the parallel simulations of the iteration, thereby improving computational efficiency and permitting the training to be performed within a relatively short amount of time. The contact reduction technique seeks to reduce the total number of contacts without compromising simulation accuracy. In some embodiments, the contact reduction technique is as follows. The model trainer 116 first generates an initial set of contacts by generating one contact per triangle-mesh face. The contact position on each face is determined by performing iterative local minimization to find a closest point on the face to an opposing shape, using projected gradient descent with adaptive stepping. For example, nut and bolt meshes having 16,000 contacts can be generated in <1 millisecond, which is orders of magnitude faster than conventional convex or mesh collision. To reduce the initial set of contacts, the model trainer 116 uses the concept of contact patches, which are sets of contacts that are proximal and share a normal. The contact patches can be generated in three phases. First, the model trainer 116 generates candidate contacts using SDF collisions fora batch of triangles (e.g., 1024 triangles). Second, the model trainer 116 assigns candidate contacts to existing contact patches in the shape pair based on similarity between normal of the candidate contacts and the existing contact patches. Third, for unassigned candidate contacts, the model trainer 116 finds the candidate contact with the deepest penetration, creates a new contact patch, add-remaining candidate contacts to the new contact patch based on normality similarity, and adds the new contact patch to the existing list of contact patches. The foregoing process is repeated until no candidate contacts remain. When adding the new contact patch to the existing list of contact patches, the model trainer 116 can also check whether a contact patch with a similar normal exists. The model trainer 116 can either add both contact patches or replace an existing contact patch having a similar normal with the new contact patch, using a measure that maximizes patch surface area, prioritizes contacts with high penetration depth, and restricts the number of patches to a given number (e.g, a number N where 128≤N≤256). In some embodiments, the contact reduction technique is performed by a GPU. Pseudocode for the foregoing contact reduction technique is presented below as Algorithm 1. The input to Algorithm 1 is two potentially contacting shapes (a, b), and the output is a list of patches (i.e., sets of contacts) for each shape pair.

---

Algorithm 1:

---

```
foreach shape pair (a, b) do
    patches = 0
    foreach batch in triangles(a, b) do
        candidates ←GenerateContacts(batch)
        patches ←Assign(candidates, patches)
        while candidates ≠ 0 do
            best ←FindDeepest(candidates)
            patch←BinReduce(candidates, best)
            patches←AddPatch(patch, patches)
        end
    end
end
```

---

In some other embodiments, any technically feasible contact reduction technique can be used, including any combination of (1) normal similarity technique(s) that assign contacts with similar surface normals to the same bin, cull similar bins, and cull similar contacts; (2) penetration depth technique(s) that cull bins and contacts with negligible penetration, which often have minimal impact on dynamics; and/or (3) data-driven technique(s) that train neural networks to perform contact reduction but can require separate data collection and learning.

In some embodiments, the model trainer 116 employs a Gauss-Seidel solver to simulate physics, including the interactions between objects, during the simulations described above. Experience has shown that Gauss-Seidel solvers are robust and converge relatively quickly for well-conditioned problems. In addition, the contact reduction techniques, described above, greatly accelerate the performance of Gauss-Seidel solvers to achieve better performance than some other types of solvers, such as Jacobi solvers.

Once trained, the policy models 150 can be deployed to any suitable applications, such as the robot control application 145, to generate actions (e.g., the actions 304) used to control physical robots to perform tasks given observations (e.g., the observations 302) within physical environments. As described, in some embodiments, each action can be in the form of input to a controller of a robot that causes the robot to move. Examples of controllers include joint-space inverse differential kinematics (IK) motion controllers, joint space inverse dynamics (ID) controllers, task-space impedance controllers, operational-space (OSC) motion controllers, open-loop force controllers, closed-loop P force controllers, and hybrid force-motion controllers. In some embodiments, the action space is defined as targets for the implemented controllers. In some embodiments, the targets for joint-space IK, joint-space ID, task-space impedance, and OSC motion controllers can be 6-DOF transformations relative to the current state, with the rotation expressed as axis-angle. In some embodiments, the targets for the open-loop and closed-loop controllers can be 3D force vectors. In some embodiments, the targets for hybrid force-motion controllers can be the 9-dimensional union of the previous two action spaces. Although described herein primarily with respect to controllers, policy models can generate any technically feasible output in some embodiments. For example, in some embodiments, policy models can directly generate torques to apply to the joints of a robot, rather than inputs to a controller that maps the inputs to joint torques. As another example, in some embodiments, policy models can generate locations where manipulators of a robot should move, and inverse kinematics can be applied to determine how to reach the locations.

Figure 4A:
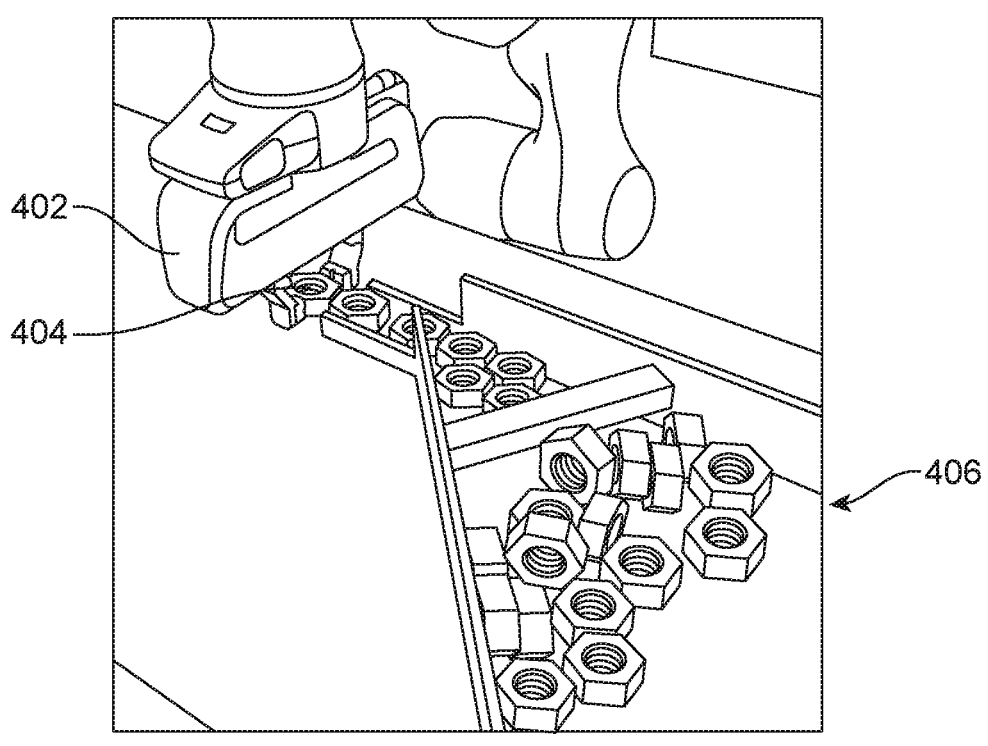
FIGS. 4A-4B illustrate an exemplar pick, place, and screw robot assembly task, according to various embodiments.
Figure 4B:
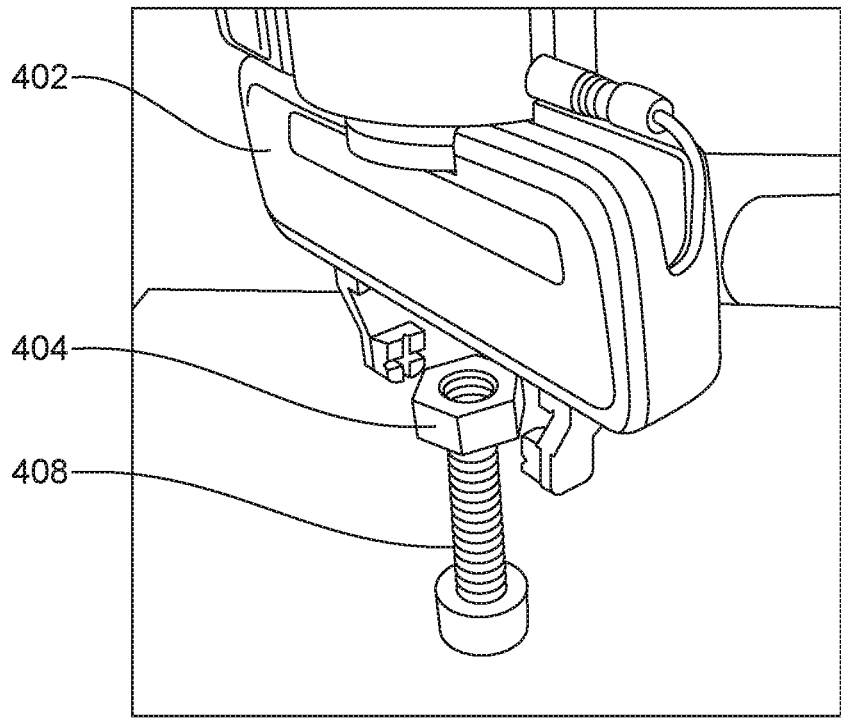

FIGS. 4A-4B illustrate an exemplar pick, place, and screw robot assembly task, according to various embodiments. In some embodiments, policies can be trained for each step of an assembly plan that includes steps describing how to manufacture or assemble an object in a sequence of steps, such as the pick, place, and screw steps in the assembly task shown in FIGS. 4A-4B. As shown in FIG. 4A, a robot 402 is simulated retrieving a nut 404 from a vibrating feed mechanism 406. Picking up the nut 404 involves the robot 402 grasping the nut 404 with a parallel-jaw gripper from a random location on a work surface. Multiple such simulations can be performed in parallel during each iteration of a reinforcement learning process to train a first policy model to perform the task of picking up a nut.

In some embodiments, at the start of each pick episode, a 6-DOF robot hand pose and a 2-DOF nut pose (constrained by the work surface) are randomized over a large spatial range. In such cases, the observation space for the pick sub-policy can be the pose (position and quaternion) of the robot hand and nut, as well as the linear and angular velocity of the robot hand. In the real world, the pose and velocity of the robot hand can be determined to reasonable accuracy (<1 cm) through a forward kinematic model and proprioception of joint positions and velocities, whereas the pre-grasp pose of the nut (a known model) can be accurately estimated through pose estimation frameworks. In some embodiments, the action space for the pick sub-policy can be joint-space IK controller targets with damped least-squares.

During training, a dense reward can be formulated as the distance between fingertips of the robot hand and the nut. The distance can be defined as $\|k_n - k_f\|$, where $k_n$ and $k_f$ are both tensors of 2-4 keypoints distributed across the nut central axis and end-effector approach axis, respectively. Intuitively, such a distance is computed on a single manifold, which obviates tunning. The collinearity of each keypoint set also permits equivariance to rotation of the robot hand (i.e., yaw) about the nut central axis. After executing the pick sub-policy for a prescribed (constant) number of timesteps, a manually specified grasps-and-lift action can be executed. Policy success can be defined as whether the nut remains in the grasp after lifting. If successful, a success bonus can be added to the episodic return during training. Experience has shown that the pick sub-policy can learn to execute a fast straight-line path towards the nut, followed by a slow pose refinement. Due to the collinearity of the keypoints, the final pose distribution of the robot hand can be highly multimodal in yaw.

As shown in FIG. 4B, the robot 402 is simulated tightening the nut 404 onto a bolt 408. The robot 402 transports the nut 404 to the top of the bolt 408, which can be fixed to a surface. Then, the robot 402 brings the nut 404 into contact with the bolt 408, engages the mating threads, and tightens the nut 404 until the nut 404 contacts the base of the bolt 408 head. Multiple simulations can be performed in parallel during each iteration of a second reinforcement learning process to train a second policy model to perform the task of transporting a nut to the top of a bolt. In addition, multiple simulations can be performed in parallel during each iteration of a third reinforcement learning process to train a third policy model to perform the task of tightening a nut until the nut contacts the base of a bolt head.

In some embodiments, at the start of each place episode, the robot hand and nut are reset to a known stable grasp pose. The nut-in-gripper position/rotation and bolt position are also randomized. The hand-and-nut are moved to a random pose using the joint space IK controller. Training can then be initiated. The observation space for the place sub-policy can be identical to the observation space for the pick sub-policy, described above, except the observation space for the place sub-policy can also include the pose (position and quaternion) of the bolt. When grasped, the nut pose may be challenging to determine in the real world. In some embodiments, visuotacticle sensing with known object models can be used for high accuracy pose estimation. The action space of the place sub-policy can be identical to the action space for the pick sub-policy. A dense reward can again be formulated as the keypoint distance, now between the bolt and nut central axes. The keypoints can be defined such that, when perfectly aligned, the base of the nut is located 1 mm above the top of the bolt. Success can be defined as when the average keypoint distance is less than 0.8 mm. Experience has shown that, with the forgoing approach, the place sub-policy is able to achieve a relatively high success rate within randomization bounds. Although having negligible effect on steady-state error, an effective strategy for smoothing the place trajectory is to apply an action gradient penalty at each timestep. In some embodiments, the penalty can be equal to $\beta \|a_t - a_{t-1}\|$, where a is the 6-dimensional action vector and $\beta$ is a hyperparameter (e.g., 0.1).

In some embodiments, at the start of each screw episode, the robot hand and nut are reset to a stable grasp pose, randomized relative to the top of the bolt. The nut-in-gripper position is also randomized as described above. Among the pick, place, and screw sub-policies, the screw sub-policy is generally the most contact-rich and challenging to train. For the screw sub-policy, the robot needs to bring the nut into contact with the bolt, engage the respective threads, generate precise torques along the arm joints to allow the high-inertia robot links to admit the rigid bolt constraint, and maintain appropriate posture of the gripper of the robot with respect to the nut during tightening. As a simplifying assumption, the joint limit of the end-effector of the robot can be removed, allowing the robot to avoid regrasping. Nevertheless, experience has shown that training can produce a diverse range of pathologies, such as high-energy collision with the bolt shank, roll-pitch misalignment of the nut when first engaging the bolt threads, jamming of the nut during tightening, and precession of the gripper around the bolt during tightening, which can induce slip between the gripper and nut. To overcome such issues, a systematic exploration of controllers/gains, observation/action spaces, and baseline rewards is executed in some embodiments. First, policies for 3 task-space controllers can be evaluated over a wide range of gains, and the controller-gain configuration with the highest success rate can be chosen. Then, a number (e.g., 4) observation spaces are evaluated, and the observation space with the highest success rate is selected for use. The procedure continued with 2 action spaces and 3 baseline rewards. Success can be defined as when the nut is less than 1 thread away from the base of the bolt. To encourage stable root posture, a dense reward can be formulated that includes the sum of the keypoint distance between the nut and the base of the bolt and between the end-effector of the robot and the nut. To prioritize both task completion and efficient training, early termination can be applied on success and failure.

To perform the pick, place, and screw robot assembly task, the pick, place, and screw sub-policies need to be chained together. However, policy chaining can be challenging because errors in each sub-policy can accumulate into poor overall performance. In some embodiments, sub-policies, such as the pick, place, and screw sub-policies, are chained end-to-end as follows. When training a given sub-policy, the initial states are randomized to span the distribution of final states of a preceding trained sub-policy, if any. For example, the initial states of the screw sub-policy can be defined to span the maximum observed error of the place sub-policy. For a small number of sub-policies, such a strategy can be effective. However, the strategy does not scale well to long sequences, as policy N needs to be trained and sequence 0 . . . N needs to be evaluated before training policy N+1. To facilitate smoothness, an exponential moving average can be applied on place actions in some embodiments.

Figure 5:
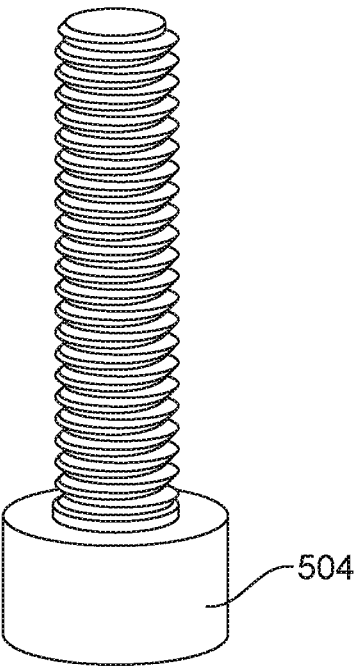
FIG. 5 illustrates an exemplar signed distance function representation of a bolt, according to various embodiments.

FIG. 5 illustrates an exemplar signed distance function representation of a bolt, according to various embodiments. In FIG. 5, a mesh 504 of the isosurface of the SDF representation of the bolt is shown for illustrative purposes. The SDF representation specifies distances from points in a virtual environment to a surface of the bolt within 144× 256×144 voxels. Some other types of representations, such as convex hull representations, do not represent concave features. Some tasks, such as inserting one object into another object, cannot be simulated using the other representations. The SDF representation does represent concave features and permits the simulation of tasks such as inserting one object into another object.

Figure 6A:
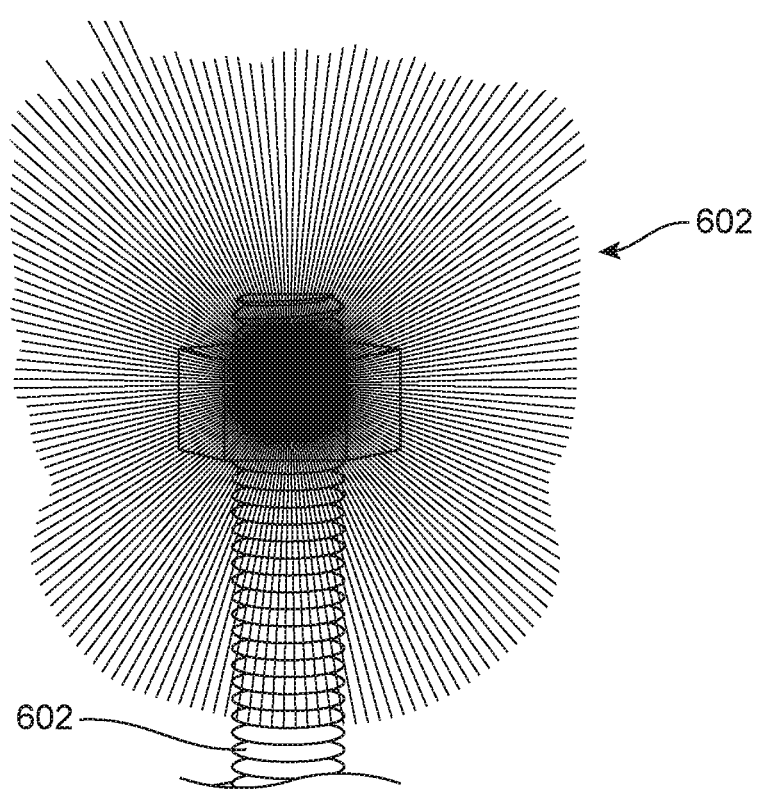
FIG. 6A illustrates exemplar contacts between a nut and a bolt during a robot assembly task, according to various embodiments.

FIG. 6A illustrates exemplar contacts between a nut and a bolt during a robot assembly task, according to various embodiments. As shown, a simulation of a nut (not shown) being tightened on a bolt 602 can produce a large number of contacts 604, each of which is highlighted by a line in FIG. 6A. An example of approximately 16,000 contacts 604 is shown for illustrative purposes. More generally, contact-rich interactions during a robot task can include more than 100 contacts in some embodiments.

Figure 6B:
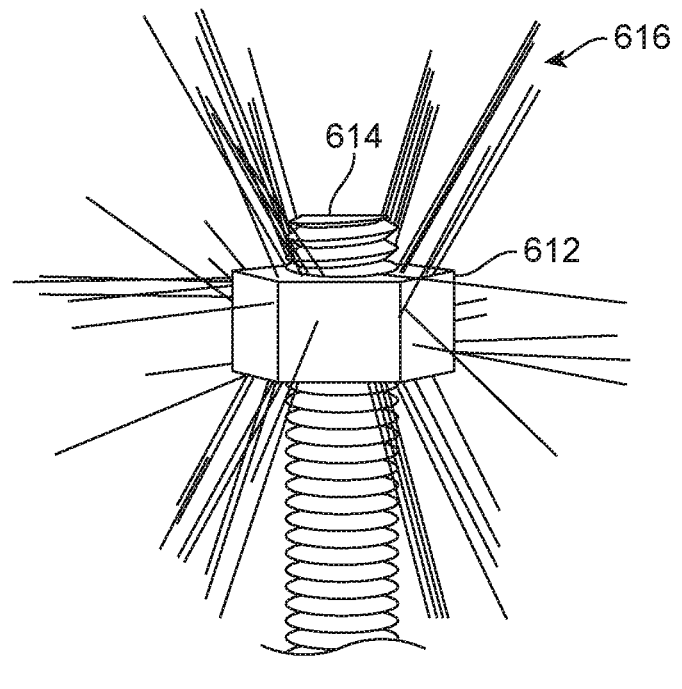
FIG. 6B illustrates exemplar contacts between a nut and a bolt during a robot assembly task after contact reduction, according to various embodiments.

FIG. 6B illustrates exemplar contacts between a nut and a bolt during a robot assembly task after contact reduction, according to various embodiments. As shown, after the contact reduction technique described above in conjunction with FIG. 3 is applied, a simulation of a nut 612 being tightened onto a bolt 614 produces a significantly smaller number of contacts 616, each of which is highlighted by a line in FIG. 6B. Illustratively, the approximately 16,000 contacts 604 in FIG. 6A are reduced to approximately 300 contacts 616 by the contact reduction technique.

Figure 7:
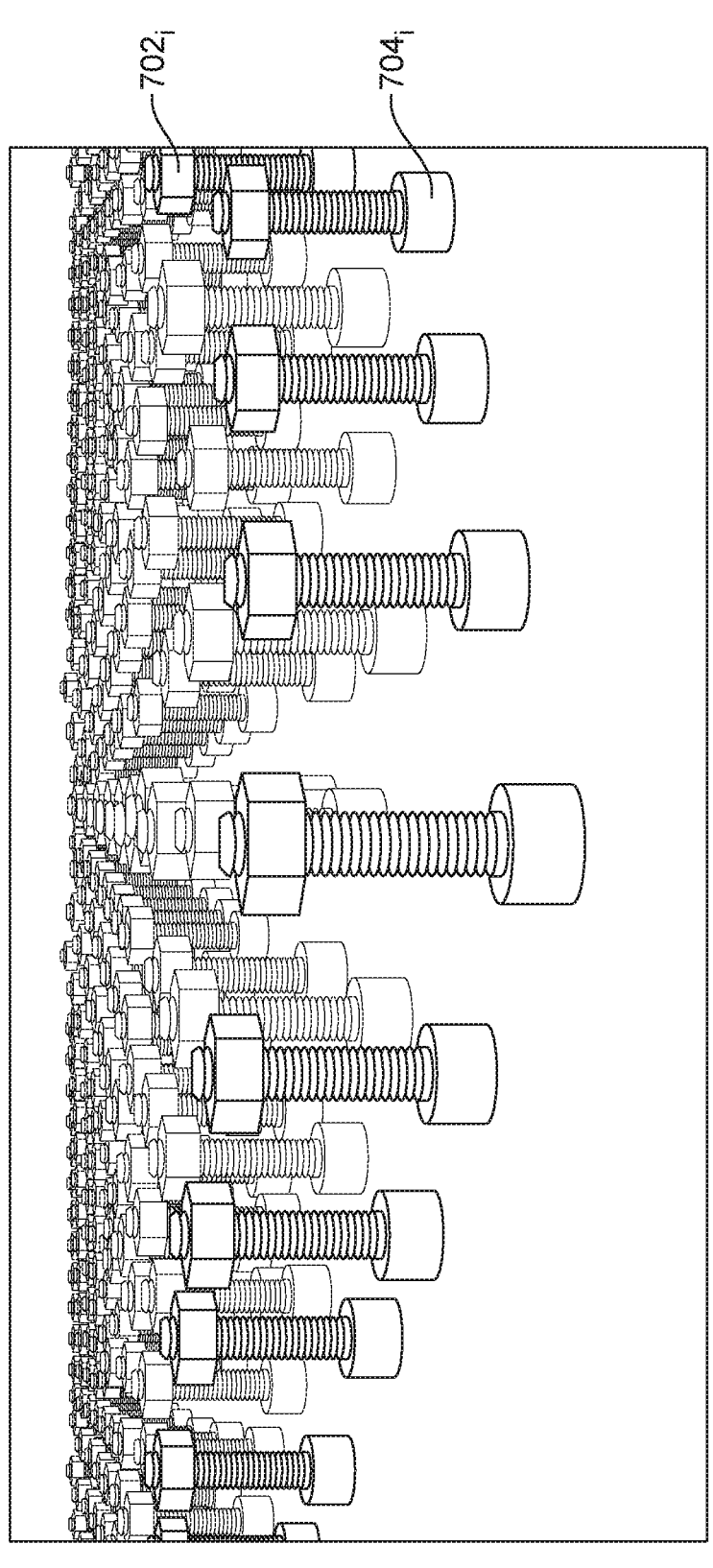
FIG. 7 illustrates exemplar parallel simulations of nut and bolt interactions, according to various embodiments.

FIG. 7 illustrates exemplar parallel simulations of nut and bolt interactions, according to various embodiments. As described, parallel simulations of tasks, such as parallel simulations of nuts $702_i$ (referred to herein individually as a nut 702 and collectively as nuts 702) being tightened onto bolts $704_i$ (referred to herein individually as a bolt 704 and collectively as bolts 704), can be performed during each iteration of a reinforcement learning process to train a policy model to perform the task of tightening nuts onto bolts. Once trained, the policy model can be applied to control a physical robot to perform the task of tightening a nut onto a bolt.

Figure 8:
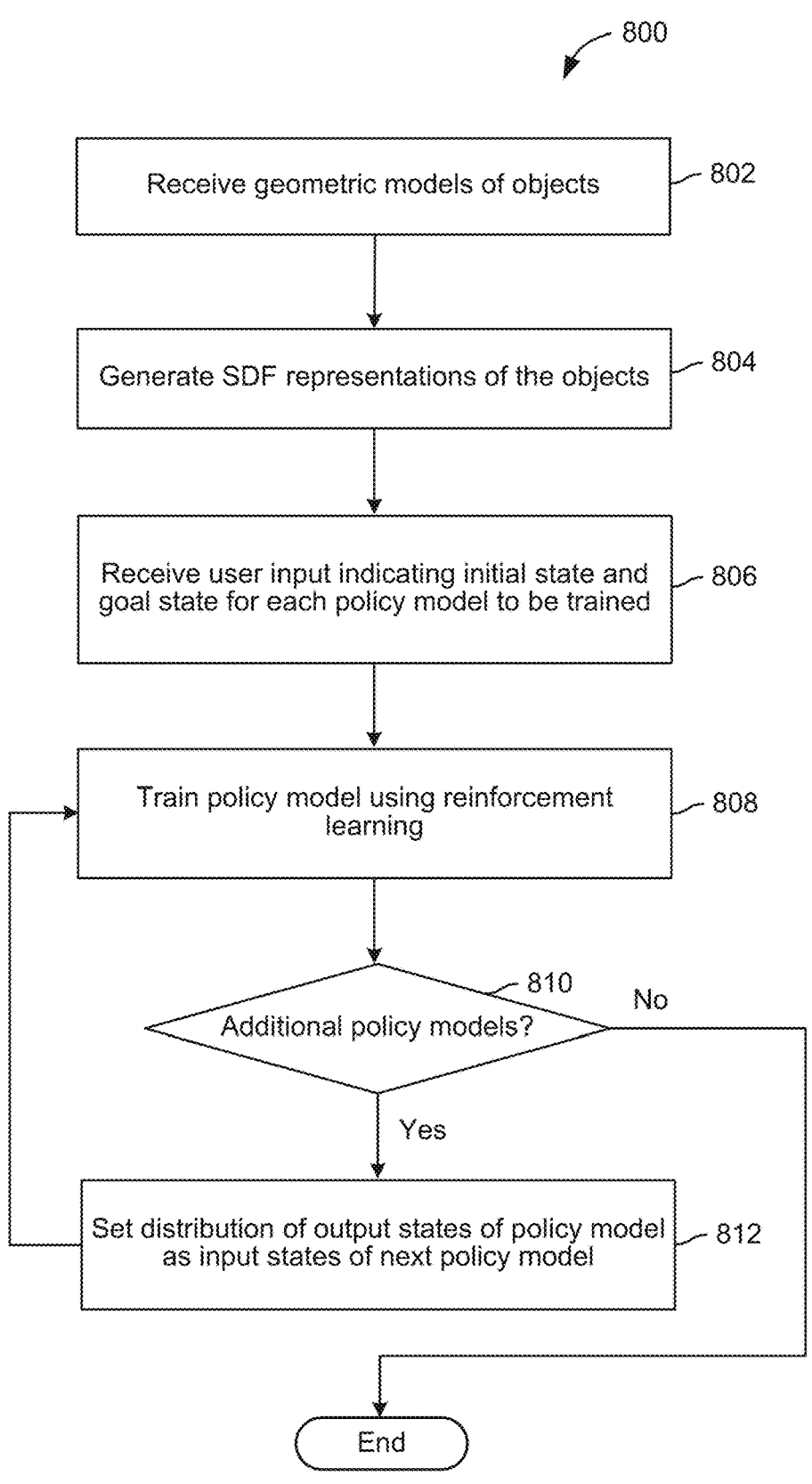
FIG. 8 is a flow diagram of method steps for training a policy model for a robot task, according to various embodiments.

FIG. 8 is a flow diagram of method steps for training a policy model for a robot task, according to various embodiments. Although the method steps are described in conjunction with the systems of FIGS. 1-2, persons skilled in the art will understand that any system configured to perform the method steps in any order falls within the scope of the present embodiments. Although described with respect to determining a single pixel color, in some embodiments, the method steps can be repeated to determine the colors of multiple pixels when rendering an image, such as a frame of a video or a standalone image.

As shown, a method 800 begins at step 802, where the model trainer 116 receives geometric models of objects to be simulated. Examples of objects include nuts, bolts, connectors, etc. Examples of geometric models include computer-aided design (CAD) models of objects. The model trainer 116 also knows constraints associated with a robot that interacts with such objects. Examples of robot constraints include motors of the robot, force that can be applied by the motors, ranges of motion associated with links of the robot, etc.

At step 804, the model trainer 116 generates SDF representations of the objects. The SDF representations permit the objects to be simulated more efficiently than the geometric models received at step 802. The SDF representations can be generated in any technically feasible manner, such as via the techniques described above in conjunction with FIG. 3, in some embodiments.

At step 806, the model trainer 116 receives user input indicating the initial state and the goal state for each policy model to be trained. In some embodiments, the initial state specifies the initial positions of one or more objects in the simulation environment. For example, the initial state could specify that an object is at a particular position on a work surface. In some embodiments, the goal state specifies a desired result that the policy model should achieve using one or more objects. For example, the goal state could specify that one object (e.g., a nut) is inserted into another object (e.g., a bolt).

At step 808, the model trainer 116 trains a policy model using reinforcement learning. In some embodiments, the policy model is trained based on the initial and goal states, and training the policy model includes, for a number of iterations, (1) performing a contact reduction technique to reduce a set of contacts between objects in each simulation, and (2) updating parameters of the policy model based on simulations of the robot performing the task to reach the goal state from the initial state and the reduced set of contacts, as described in greater detail below in conjunction with FIG. 9.

At step 810, if there are no additional policy models to train, then the method 800 ends. On the other hand, if there are additional models to train, then the method 800 continues to step 812, where the model trainer 116 sets a distribution of the output states of the trained policy model as the input states of a next policy model to be trained. As described, trained policies can have finite error. In some embodiments, the distribution of output states of each trained policy are used as the set of locations that are input into a subsequent policy that is then trained to be robust to the various input states, etc. Thereafter, the method 800 returns to step 808, where the model trainer 116 trains the next policy model using reinforcement learning.

Figure 9:
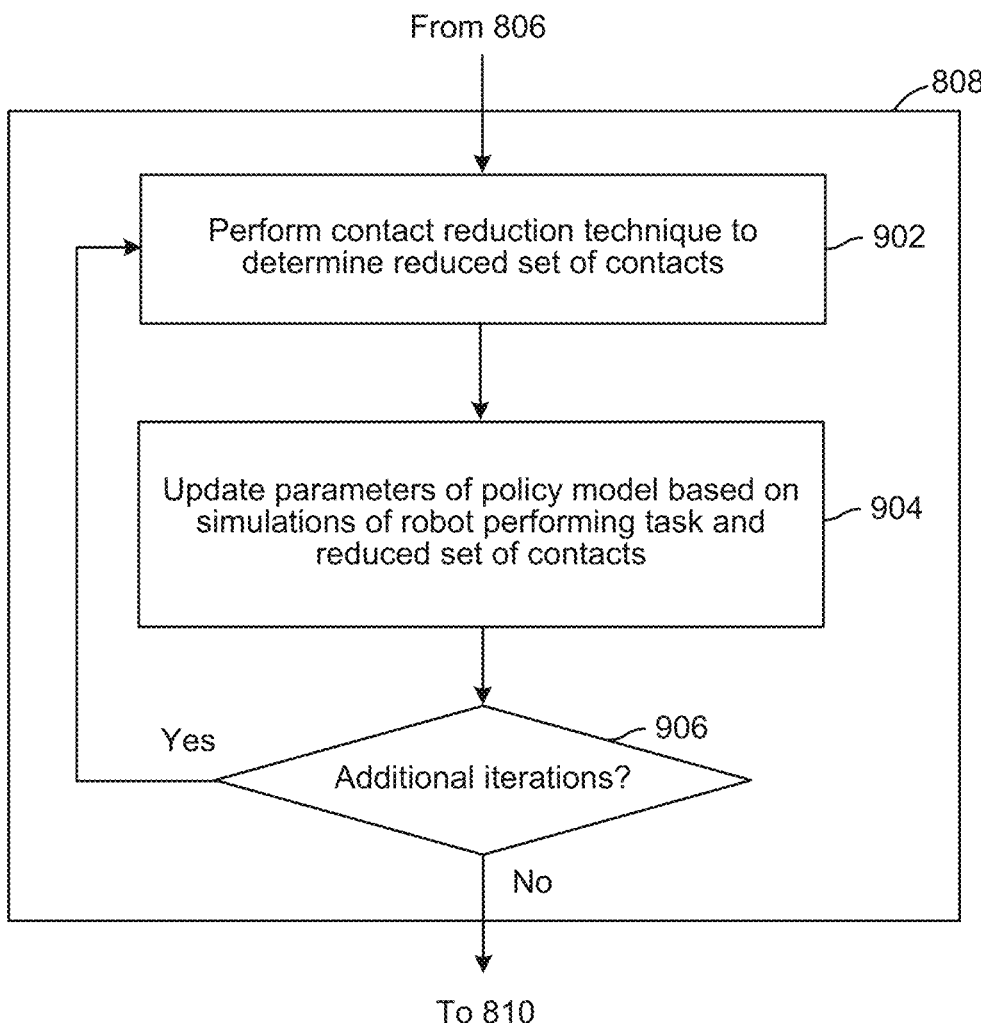
FIG. 9 is a more detailed illustration of a step of FIG. 8, according to various embodiments.

FIG. 9 is a more detailed illustration of the step of training a policy model in FIG. 8, according to various embodiments. Although the method steps are described in conjunction with the systems of FIGS. 1-2, persons skilled in the art will understand that any system configured to perform the method steps in any order falls within the scope of the present embodiments. Although described with respect to determining a single pixel color, in some embodiments, the method steps can be repeated to determine the colors of multiple pixels when rendering an image, such as a frame of a video or a standalone image.

As shown, at step 902, the model trainer 116 performs a contact reduction technique to determine a reduced set of contacts between objects in each simulation of the robot performing the task. In some embodiments, the model trainer 116 performs the contact reduction technique described above in conjunction with FIG. 3.

At step 904, the model trainer 116 updates parameters of the policy model based on simulations of the robot performing the task and the reduced set of contacts. In some embodiments, the simulations employ a Gauss-Seidel solver to simulate physics, including the interactions between objects. In some embodiments, the simulations of the robot performing the task are executed in parallel (e.g., on a GPU), and the parameters of the policy model are updated to learn a policy for moving the robot to achieve a goal state from an initial state. During the simulations, movements of the robot are simulated according to known constraints, and the simulations are used to determine how well the policy model being trained is performing, which can be calculated as a reward. Then, parameters of the policy model are updated via backpropagation so as to improve the performance of the policy model.

At step 906, if additional iterations during the training are to be performed, then the method 800 returns to step 902, where the model trainer 116 performs the contact reduction technique again.

Figure 10:
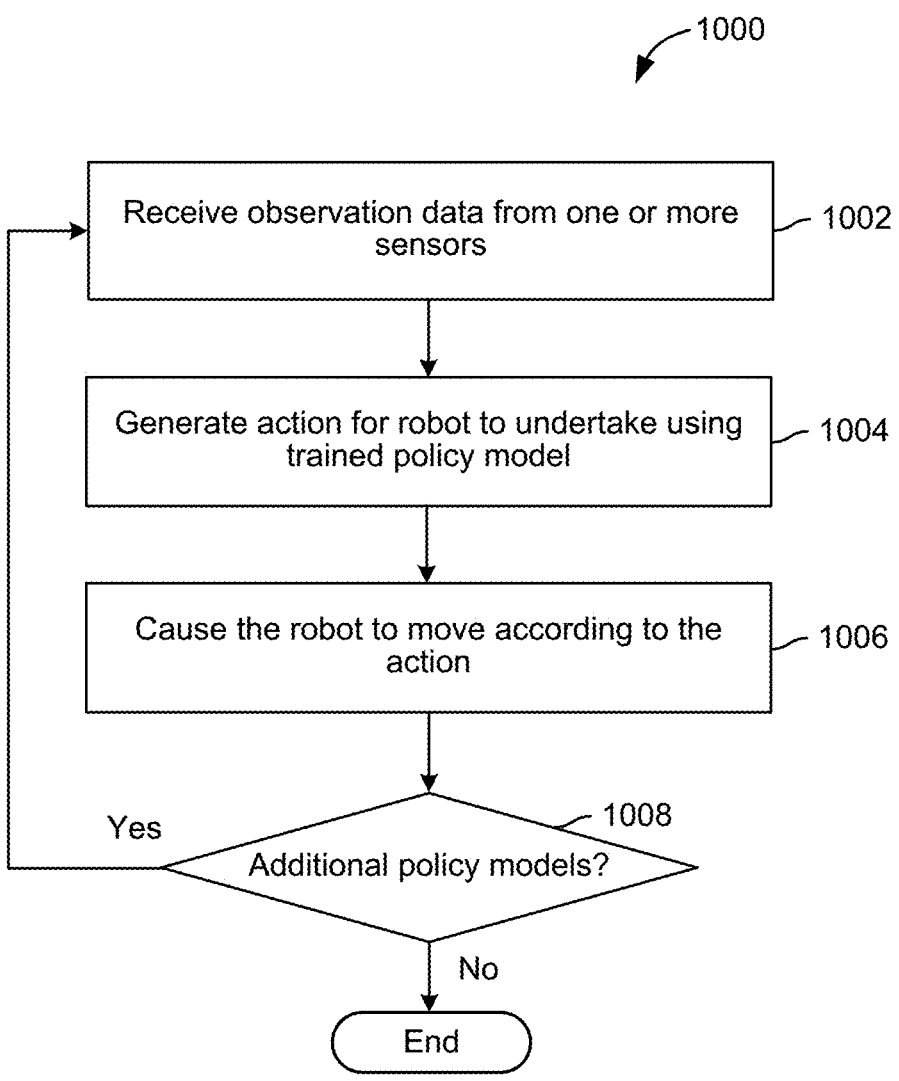
FIG. 10 is a flow diagram of method steps for controlling a robot to perform a task using a trained policy model, according to various embodiments.

FIG. 10 is a flow diagram of method steps for controlling a robot to perform a task using a trained policy model, according to various embodiments. Although the method steps are described in conjunction with the systems of FIGS. 1-3, persons skilled in the art will understand that any system configured to perform the method steps in any order falls within the scope of the present embodiments. Although described with respect to determining a single pixel color, in some embodiments, the method steps can be repeated to determine the colors of multiple pixels when rendering an image, such as a frame of a video or a standalone image.

As shown, a method 1000 begins at step 1002, where the robot control application 146 receives observation data from one or more sensors in a physical environment. As described, any technically feasible observation data, such as image data captured by one or more cameras, data on the joint positions of a robot, object position information, etc. can be used in some embodiments. In some embodiments, teacher policies can also be trained to take privileged information (e.g., 6-DOF states) as observation input, and then used to train student policies through imitation learning. In such cases, the student policies can take images, which can be captured by sensors, as observation input and replicate actions of the teacher policies. In some embodiments, actor policies can be trained to access images captured by sensors, and critic models can access privileged information.

At step 1004, the robot control application 146 generates an action for a physical robot to undertake using a trained policy model. In some embodiments, the robot control application 146 applies one of the policy models trained according to the method 800, described above in conjunction with FIG. 8, to the observation data received at step 1002. Then, the trained policy model outputs the action for the physical robot to undertake. In some embodiments, the action can be in the form of input to a controller of the physical robot.

At step 1006, the robot control application 146 causes the physical robot to move according to the action. In some embodiments, when the action generated at step 1004 is in the form of input to a robot controller, the input is transmitted to the robot controller, which controls the robot to move according to the action.

At step 1008, if there are additional trained policy models to apply, the method 1000 returns to step 1002, where the robot control application 146 receives additional sensor data. Returning to the example of a pick, place, and screw robot assembly task, one policy model could be trained for the pick sub-task, another policy model could be trained for the place sub-task, and yet another policy model could be trained for the screw sub-task.

In sum, techniques are disclosed for training and utilizing machine learning models to perform robotic tasks with objects whose interactions involve a relatively large number of contacts. In some embodiments, each of one or more machine learning models is trained via reinforcement learning by (1) performing parallel simulations of a robot performing a task involving objects that are represented as signed distance functions (SDFs), and (2) updating parameters of the machine learning model(s) based on the simulations. A contact reduction technique is applied to reduce the number of contacts between objects in each simulation. The simulations employ a solver, such as the Gauss-Seidel solver, to simulate physics, including the interactions between objects. Subsequent to training, the states of physical objects can be input into the machine learning model(s) as observations, and the machine learning model(s) generate actions that can be used to control a physical robot to perform task(s) involving the physical objects.

At least one technical advantage of the disclosed techniques relative to the prior art is that, with the disclosed techniques, policy models for performing robotic tasks can be trained in a computationally efficient manner using simulations. Experience has shown that the simulations can be tens of thousands of times faster than simulations using conventional techniques. Further, the disclosed techniques do not require real-world training or tedious manual demonstrations and corrections in order to train the policy models. These technical advantages represent one or more technological improvements over prior art approaches.

1. In some embodiments, a computer-implemented method for controlling a robot comprises performing a plurality of simulations of a robot interacting with one or more objects represented by one or more signed distance functions (SDFs), wherein performing the plurality of simulations comprises reducing a number of contacts between the one or more objects that are being simulated, and updating one or more parameters of a machine learning model based on the plurality of simulations to generate a trained machine learning model.

2. The computer-implemented method of clause 1, wherein reducing the number of contacts between the one or more objects comprises generating a set of candidate contacts based on one or more collisions between the one or more objects, assigning one or more candidate contacts included in the set of candidate contacts to one or more contact patches, wherein each contact patch is associated with a point of contact between two objects included in the one or more objects that share a normal at the point of contact, and adding a contact patch for one or more candidate contacts included in the set of candidate contacts that are associated with a penetration between objects that is deepest.

3. The computer-implemented method of clauses 1 or 2, further comprising determining a distribution of outputs generated by the trained machine learning model, performing a plurality of additional simulations of the robot interacting with the one or more objects based on the distribution of outputs, and updating one or more parameters of another machine learning model based on the plurality of additional simulations to generate a second trained machine learning model.

4. The computer-implemented method of any of clauses 1-3, wherein the number of contacts between the one or more objects that are being simulated comprises at least one hundred contacts.

5. The computer-implemented method of any of clauses 1-4, wherein each simulation included in the plurality of simulations executes one or more Gauss-Seidel solver operations.

6. The computer-implemented method of any of clauses 1-5, further comprising converting one or more geometric representations of the one or more objects to the one or more SDFs.

7. The computer-implemented method of any of clauses 1-6, further comprising receiving sensor data associated with an environment that includes one or more physical objects, executing the trained machine learning model on the sensor data to generate an action, and causing a physical robot to perform one or more movements based on the action.

8. The computer-implemented method of any of clauses 1-7, wherein the one or more movements comprise at least one of picking up an object, placing an object, inserting an object into another object, or fastening a plurality of objects together.

9. The computer-implemented method of any of clauses 1-8, wherein the trained machine learning model generates an input to a controller of a physical robot.

10. In some embodiments, one or more non-transitory computer-readable media store instructions that, when executed by at least one processor, cause the at least one processor to perform the steps of performing a plurality of simulations of a robot interacting with one or more objects represented by one or more signed distance functions (SDFs), wherein performing the plurality of simulations comprises reducing a number of contacts between the one or more objects that are being simulated, and updating one or more parameters of a machine learning model based on the plurality of simulations to generate a trained machine learning model.

11. The one or more non-transitory computer-readable media of clause 10, wherein reducing the number of contacts between the one or more objects comprises generating a set of candidate contacts based on one or more collisions between the one or more objects, assigning one or more candidate contacts included in the set of candidate contacts to one or more contact patches, wherein each contact patch is associated with a point of contact between two objects included in the one or more objects that share a normal at the point of contact, and adding a contact patch for one or more candidate contacts included in the set of candidate contacts that are associated with a penetration between objects that is deepest.

12. The one or more non-transitory computer-readable media of clauses 10 or 11, wherein the instructions, when executed by the at least one processor, further cause the at least one processor to perform the steps of determining a distribution of outputs generated by the trained machine learning model, performing a plurality of additional simulations of the robot interacting with the one or more objects based on the distribution of outputs, and updating one or more parameters of another machine learning model based on the plurality of additional simulations to generate a second trained machine learning model.

13. The one or more non-transitory computer-readable media of any of clauses 10-12, wherein the number of contacts between the one or more objects that are being simulated comprises at least one hundred contacts.

14. The one or more non-transitory computer-readable media of any of clauses 10-13, wherein each simulation included in the plurality of simulations executes one or more Gauss-Seidel solver operations.

15. The one or more non-transitory computer-readable media of any of clauses 10-14, wherein the instructions, when executed by the at least one processor, further cause the at least one processor to perform the step of converting one or more geometric representations of the one or more objects to the one or more SDFs.

16. The one or more non-transitory computer-readable media of any of clauses 10-15, wherein the instructions, when executed by the at least one processor, further cause the at least one processor to perform the steps of receiving sensor data associated with an environment that includes one or more physical objects, executing the trained machine learning model on the sensor data to generate an action, and causing a physical robot to perform one or more movements based on the action.

17. The one or more non-transitory computer-readable media of any of clauses 10-16, wherein the sensor data comprises at least one of image data captured by one or more cameras, data on positions of joints of the physical robot, or data indicating the positions of the one or more physical objects.

18. The one or more non-transitory computer-readable media of any of clauses 10-17, wherein causing the physical robot to perform the one or more movements comprises transmitting an output of the machine learning model to a controller of the physical robot.

19. In some embodiments, a system comprises one or more memories storing instructions, and one or more processors that are coupled to the one or more memories and, when executing the instructions, are configured to perform a plurality of simulations of a robot interacting with one or more objects represented by one or more signed distance functions (SDFs), wherein performing the plurality of simulations comprises reducing a number of contacts between the one or more objects that are being simulated, and update one or more parameters of a machine learning model based on the plurality of simulations to generate a trained machine learning model.

20. The system of clause 19, wherein the one or more processors, when executing the instructions, are further configured to receive sensor data associated with an environment that includes one or more physical objects, execute the trained machine learning model on the sensor data to generate an action, and causing a physical robot to perform one or more movements based on the action.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semi-conductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for controlling a robot, the method comprising:

performing a plurality of iterations of reinforcement learning to train an untrained machine learning model to generate a trained machine learning model, wherein performing each iteration included in the plurality of iterations comprises:

performing a plurality of simulations of the robot interacting with one or more objects represented by one or more signed distance functions (SDFs), wherein performing the plurality of simulations comprises reducing a number of contacts between the one or more objects that are being simulated in each simulation included in the plurality of simulations by:

assigning one or more candidate contacts included in a set of candidate contacts between the one or more objects to a set of existing first contact patches based on surface normals of the set of candidate contacts, identifying a first candidate contact having a deepest penetration associated with the one or more objects among remaining candidate contacts that have not been assigned to any existing contact patch in the set of existing contact patches, and creating a new contact patch to add to the set of existing contact patches based on the first candidate contact by assigning, to the new contact patch, one or more candidate contacts included in the remaining candidate contacts having surface normals similar to the first candidate contact; and updating one or more parameters of the untrained machine learning model based on the plurality of simulations.

2. The computer-implemented method of claim 1, further comprising:

determining a distribution of outputs generated by the trained machine learning model;

performing a plurality of additional simulations of the robot interacting with the one or more objects based on the distribution of outputs; and updating one or more parameters of another machine learning model based on the plurality of additional simulations to generate a second trained machine learning model.

3. The computer-implemented method of claim 1, wherein the number of contacts between the one or more objects that are being simulated comprises at least one hundred contacts.

4. The computer-implemented method of claim 1, wherein each simulation included in the plurality of simulations executes one or more Gauss-Seidel solver operations.

5. The computer-implemented method of claim 1, further comprising converting one or more geometric representations of the one or more objects to the one or more SDFs.

6. The computer-implemented method of claim 1, further comprising:

receiving sensor data associated with an environment that includes one or more physical objects;

executing the trained machine learning model on the sensor data to generate an action; and causing a physical robot to perform one or more movements based on the action.

7. The computer-implemented method of claim 6, wherein the one or more movements comprise at least one of picking up an object, placing an object, inserting an object into another object, or fastening a plurality of objects together.

8. The computer-implemented method of claim 1, wherein the trained machine learning model generates an input to a controller of a physical robot.

9. The computer-implemented method of claim 1, wherein one or more input states of another machine learning model are set based on a distribution of output states of the trained machine learning model.

10. The computer-implemented method of claim 1, wherein reducing the number of contacts between the one or more objects further comprises;

performing a first comparison of the new contact patch with the set of existing contact patches, and making a selection between adding the new contact patch to the set of existing contact patches without replacing any existing contact patch included in the set of existing contact patches or replacing an existing contact patch included in the set of existing contact patches with the new contact patch, the selection being based on the first comparison and a measure that is based on at least one of a surface area associated with the new contact patch or a penetration associated with the first candidate contact.

11. One or more non-transitory computer-readable media storing instructions that, when executed by at least one processor, cause the at least one processor to perform the steps of:

performing a plurality of iterations of reinforcement learning to train an untrained machine learning model to generate a trained machine learning model, wherein performing each iteration included in the plurality of iterations comprises:

performing a plurality of simulations of a robot interacting with one or more objects represented by one or more signed distance functions (SDFs), wherein performing the plurality of simulations comprises reducing a number of contacts between the one or more objects that are being simulated by:

assigning one or more candidate contacts included in a set of candidate contacts between the one or more objects to a set of existing contact patches based on surface normals of the set of candidate contacts, identifying a first candidate contact having a deepest penetration associated with the one or more objects among remaining candidate contacts that have not been assigned to any existing contact patch in the set of existing contact patches, and creating a new contact patch to add to the set of existing contact patches based on the first candidate contact by assigning, to the new contact patch, one or more candidate contacts included in the remaining candidate contacts having surface normals similar to the first candidate contact; and updating one or more parameters of the untrained machine learning model based on the plurality of simulations.

12. The one or more non-transitory computer-readable media of claim 11, wherein the instructions, when executed by the at least one processor, further cause the at least one processor to perform the steps of:

determining a distribution of outputs generated by the trained machine learning model;

performing a plurality of additional simulations of the robot interacting with the one or more objects based on the distribution of outputs; and updating one or more parameters of another machine learning model based on the plurality of additional simulations to generate a second trained machine learning model.

13. The one or more non-transitory computer-readable media of claim 11, wherein the number of contacts between the one or more objects that are being simulated comprises at least one hundred contacts.

14. The one or more non-transitory computer-readable media of claim 11, wherein each simulation included in the plurality of simulations executes one or more Gauss-Seidel solver operations.

15. The one or more non-transitory computer-readable media of claim 11, wherein the instructions, when executed by the at least one processor, further cause the at least one processor to perform the step of:

converting one or more geometric representations of the one or more objects to the one or more SDFs.

16. The one or more non-transitory computer-readable media of claim 11, wherein the instructions, when executed by the at least one processor, further cause the at least one processor to perform the steps of:

receiving sensor data associated with an environment that includes one or more physical objects;

executing the trained machine learning model on the sensor data to generate an action; and causing a physical robot to perform one or more movements based on the action.

17. The one or more non-transitory computer-readable media of claim 16, wherein the sensor data comprises at least one of image data captured by one or more cameras, data on positions of joints of the physical robot, or data indicating the positions of the one or more physical objects.

18. The one or more non-transitory computer-readable media of claim 16, wherein causing the physical robot to perform the one or more movements comprises transmitting an output of the trained machine learning model to a controller of the physical robot.

19. A system, comprising:

one or more memories storing instructions; and one or more processors that are coupled to the one or more memories and, when executing the instructions, are configured to:

perform a plurality of iterations of reinforcement learning to train an untrained machine learning model to generate a trained machine learning model, wherein performing each iteration included in the plurality of iterations comprises:

performing a plurality of simulations of a robot interacting with one or more objects represented by one or more signed distance functions (SDFs), wherein performing the plurality of simulations comprises reducing a number of contacts between the one or more objects that are being simulated by:

assigning one or more candidate contacts included in a set of candidate contacts between the one or more objects to a set of existing contact patches based on surface normals of the set of candidate contacts, identifying a first candidate contact having a deepest penetration associated with the one or more objects among remaining candidate contacts that have not been assigned to any existing contact patch in the set of existing contact patches, and creating a new contact patch to add to the set of existing contact patches based on the first candidate contact by assigning, to the new contact patch, one or more candidate contacts included in the remaining candidate contacts having surface normals similar to the first candidate contact; and updating one or more parameters of the untrained machine learning model based on the plurality of simulations.

20. The system of claim 19, wherein the one or more processors, when executing the instructions, are further configured to:

receive sensor data associated with an environment that includes one or more physical objects;

execute the trained machine learning model on the sensor data to generate an action; and causing a physical robot to perform one or more movements based on the action.

* * * * *